(12) United States Patent
Maggiore

(10) Patent No.: US 10,912,292 B1
(45) Date of Patent: Feb. 9, 2021

(54) LOADING MECHANISM BUG KILLING GUN

(71) Applicant: Lorenzo Maggiore, Santa Monica, CA (US)

(72) Inventor: Lorenzo Maggiore, Santa Monica, CA (US)

(\*) Notice: Subject to any disclaimer, the term of this patent is extended or adjusted under 35 U.S.C. 154(b) by 0 days.

(21) Appl. No.: 17/064,857

(22) Filed: Oct. 7, 2020

Related U.S. Application Data

(63) Continuation of application No. PCT/US2020/027065, filed on Apr. 7, 2020.

(51) Int. Cl.

| | |
|---|---|
| F41B 11/62 | (2013.01) |
| A01M 3/00 | (2006.01) |
| F41B 11/68 | (2013.01) |
| F41B 11/52 | (2013.01) |
| A01M 27/00 | (2006.01) |
| A01M 5/02 | (2006.01) |
| F41B 11/80 | (2013.01) |

(52) U.S. Cl.
CPC ............... *A01M 3/00* (2013.01); *F41B 11/52* (2013.01); *F41B 11/62* (2013.01); *F41B 11/80* (2013.01)

(58) Field of Classification Search
CPC ......... A01M 27/00; F41B 11/52; F41B 11/62; F41B 11/68; F41G 1/35; F41G 3/08
See application file for complete search history.

(56) References Cited

U.S. PATENT DOCUMENTS

| | | |
|---|---|---|
| 1,205,586 A | 11/1916 | Worley |
| 1,611,533 A | 12/1926 | Erwin |
| 3,791,303 A | 2/1974 | Sweeney |
| 3,908,626 A | 9/1975 | Hammond |
| 4,101,076 A | 7/1978 | Bart |
| 4,653,433 A | 3/1987 | Comparetti |
| 6,220,237 B1 | 4/2001 | Johnson |
| 7,207,497 B2 | 4/2007 | Clark |
| 8,251,051 B2 | 8/2012 | Maggiore |
| 9,664,475 B1 | 5/2017 | Maggiore |
| 2006/0283433 A1 | 12/2006 | Gerardo |
| 2009/0255434 A1 | 10/2009 | Pawloski |
| 2011/0220088 A1 | 9/2011 | Maggiore |
| 2018/0064092 A1* | 3/2018 | Maggiore ............. F41B 11/682 |

(Continued)

*Primary Examiner* — Bret Hayes
(74) *Attorney, Agent, or Firm* — David A. Belasco; Belasco Jacobs & Townsley, LLP

(57) ABSTRACT

An improved loading mechanism bug killing gun includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. When the gun is cocked, the projectile loading mechanism loads a quantity of the projectiles into the chamber. When the compressed gas release mechanism is activated the projectiles are ejected from the chamber into the barrel and expelled from the gun. The gun optionally includes a laser sighting mechanism. The battery operated laser sighting mechanism is removably attached to the barrel or permanently attached with an integral, trigger operated switch.

15 Claims, 27 Drawing Sheets

(56) References Cited

U.S. PATENT DOCUMENTS

| | | |
|---|---|---|
| 2018/0066913 A1 | 3/2018 | Stevens |
| 2018/0335271 A1 | 11/2018 | Maggiore |
| 2020/0060255 A1 | 2/2020 | Dillon |

* cited by examiner

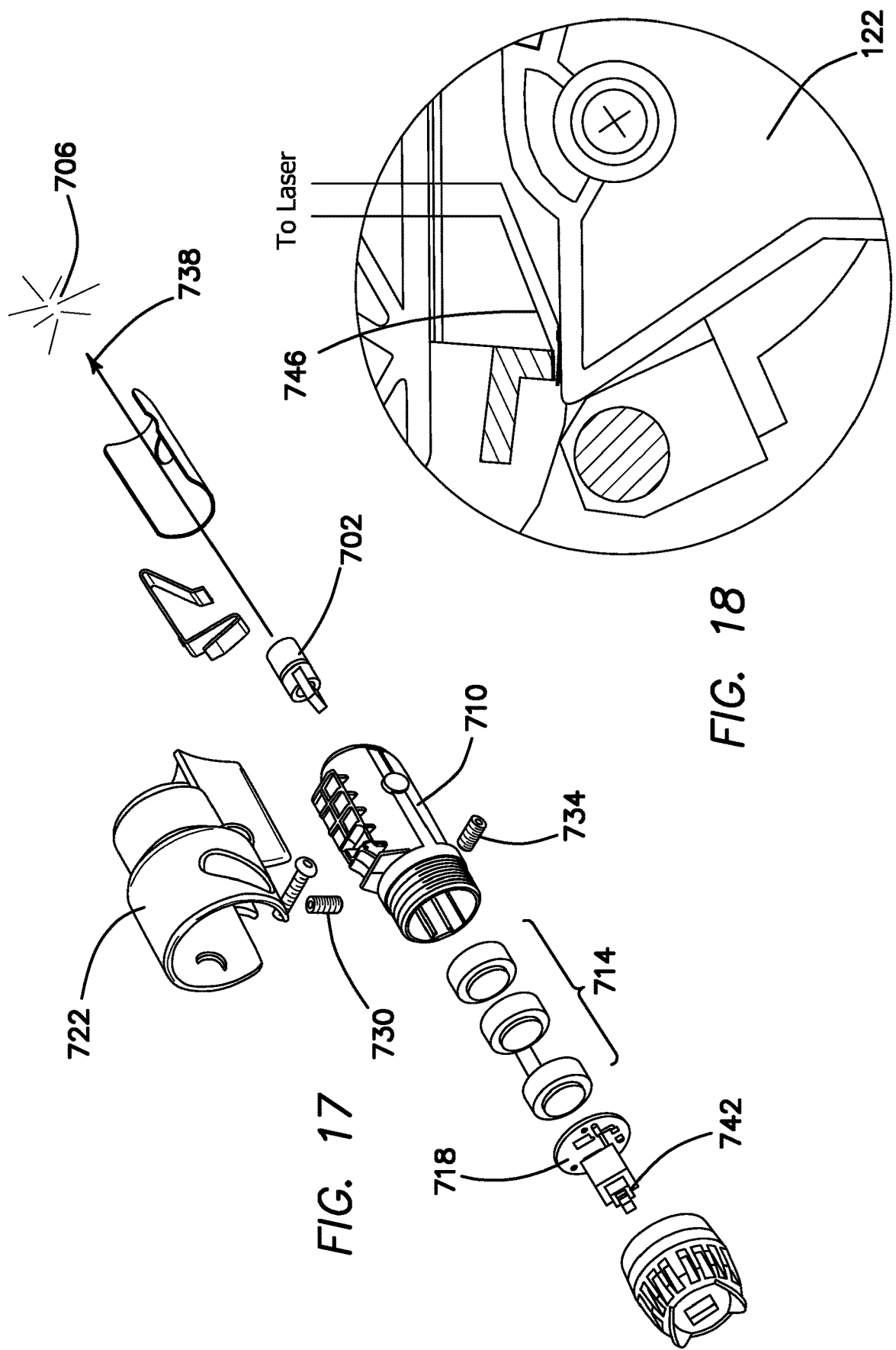

LOADING MECHANISM BUG KILLING GUN

RELATED APPLICATION

The instant application is a continuation of PCT/US20/27065 filed Apr. 7, 2020 and currently pending.

FIELD OF INVENTION

This invention relates to the fields of weaponry and insect control, and more specifically to a device for killing insects at a distance without use of toxic chemicals.

BACKGROUND OF THE INVENTION

Many methods and devices have been developed for dealing with insect pests. Many people are particularly interested in dealing with flying insects as they tend to be very visible, sometimes noisy and often possessing the capability to bite or sting. Traditional means for killing flying insects include devices such as fly swatters and their equivalent or chemical sprays. The former requires a certain skill and agility to be effective and the latter leaves a potentially harmful chemical residue in the area where used. The present invention addresses these concerns and also provides entertainment to those tasked with removal of insect pests in the form of a gun designed for shooting flying insects. Other devices developed to provide insect removal in a related fashion include the following inventions.

U.S. Pat. No. 1,611,533, issued to Kirsten, is directed to an insect shooting apparatus wherein a spring-loaded pistol-type device is used to dispense a shot or bead of material in order to exterminate various household insects such as flies. The device takes the form of a gun or pistol with a piston that is operated through a linkage mechanism and released under spring actuation by means of trigger. The movement of piston in a forward direction ultimately causes release of a shot holding a nozzle from a tapered end of the barrel. A shot holding nozzle contains a liquid which when dispersed upon an insect such as a fly and exterminates same.

U.S. Pat. No. 4,653,433, issued to Comparetti is directed to a flea zapper which takes the form of a pistol and when activated by a triggered mechanism releases a powder material for controlling insects such as fleas normally found on furry animals. The flea zapper takes the form of a handgun with a pistol-type handle with a trigger to be operated by the finger of the user. When the trigger is operated, a sample of powder is released from the powder chamber through the barrel portion through an opening and dispensed onto the animal.

U.S. Pat. No. 3,791,303, issued to Sweeny et al. is directed to deterrent ammunition which takes the form of a liquid-filled hollow ball. The projectile assembly is fired from an oversized tubular barrel extension on the end of a shotgun. The projectile assembly contains deterrent ammunition which upon rupture may control flies or other insects.

U.S. Patent Application No. 2006/0283433, published for Gerardo is directed to a projection apparatus using pressurized air. The device comprises a gun-like device, an air chamber with a trigger with a valve inside of connector that connects the air chamber to the barrel. The air chamber can be filled with compressed air and after loading the gun with an object to be fired from barrel the operator then opens the valve to allow the air pressure out of chamber releasing the air from the chamber under operation of trigger and the projectile is released from the barrel.

U.S. Pat. No. 7,207,497, issued to Clark is directed to a dry flake sprayer and method which is used to spray dry flakes utilizing a pressurized gas source. The flake spraying device includes a spray module and a gun module wherein the spray module comprises an enclosure with a gas flow conduit and a flake conduit. A supply of dry flakes is placed into the enclosure and connected to gun and when the trigger is operated. Gas flows from the control valve through nozzle which causes the flakes to be dispersed through conduit.

U.S. Pat. No. 8,251,051, issued to Maggiore, the Applicant, is directed to a bug killing gun that includes a compressed gas source fluidly connected to a chamber connected to a barrel. A compressed gas release mechanism is connected to the compressed gas source. A projectile storage magazine stores particulate projectiles and is located adjacent the chamber. A projectile loading mechanism moves the projectiles into the chamber from the magazine. A cocking mechanism is mechanically connected to the compressed gas source, the compressed gas release mechanism, and the projectile loading mechanism. A stock houses and supports the compressed gas source, the compressed gas release mechanism, the barrel, the chamber, the projectile storage magazine, the cocking mechanism and the projectile loading mechanism. When the gun is cocked, the projectile loading mechanism loads a predetermined quantity of the particulate projectiles into the chamber. When the compressed gas release mechanism is activated the projectiles are ejected from the chamber into the barrel and expelled from the gun.

It is an objective of the present invention to provide a device for killing flying insects. It is a further objective to provide such a device that uses non-toxic means for killing the insects. It is a still further objective of the invention to provide an insect killing device that incorporates positive safety features. It is yet a further objective to provide such a device that is entertaining to use and inexpensive to operate. It is another objective to provide an efficient insect killing device in a compact format. It is still another objective to provide an insect killing device that is capable of rapid repeated fire while still maintaining necessary safety features. It is yet another objective to provide an insect killing device that incorporates a mechanically driven, positive feed for loading particulate projectiles into the chamber of the gun. Finally, it is an objective of the present invention to provide an insect killing device that is durable, inexpensive and simple for the user to master.

While some of the objectives of the present invention are disclosed in the prior art, none of the inventions found include all of the requirements identified.

SUMMARY OF THE INVENTION

The present invention addresses all of the deficiencies of prior art bug killing gun inventions and satisfies all of the objectives described above.

(1) A bug killing gun providing the desired features may be constructed from the following components. A compressed gas source is provided. A chamber is provided. The chamber is fluidly connected to the compressed gas source. A barrel is provided. The barrel is located at a distal end of the chamber. A compressed gas release mechanism is provided. The release mechanism is connected to the compressed gas source. A projectile storage magazine is provided. The magazine stores particulate projectiles and is located adjacent the chamber.

A projectile loading mechanism is provided. The loading mechanism moves the particulate projectiles into the chamber from the magazine using a bi-directional cam-operated pivotally mounted subordination pole. A cocking mechanism that has a main pole is provided. The cocking mechanism is mechanically connected to the compressed gas source, the compressed gas release mechanism, and the projectile loading mechanism. A stock is provided. The stock houses and supports the compressed gas source, the compressed gas release mechanism, the barrel, the chamber, the projectile storage magazine, the cocking mechanism and the projectile loading mechanism. When the gun is cocked with the cocking mechanism, the projectile loading mechanism gathers a predetermined quantity of the particulate projectiles and positions the projectiles in the chamber. When the compressed gas release mechanism is activated the projectiles are ejected from the chamber into the barrel and expelled from the gun.

(2) In a variant of the invention, the compressed gas source is selected from the group comprising a prefilled $CO_2$ cartridge, a refillable compressed gas cylinder, a pneumatically pumped gas reservoir, a spring-activated compressed gas system and an external compressed gas line.

(3) In another variant, the spring-activated compressed gas system further comprises a cylinder. The cylinder has a front end and a rear end and is fluidly connected to the chamber at the front end. A piston is provided. The piston fits sealably in the cylinder and is located therein. A first compression spring is provided. The first compression spring urges the piston toward the front end of the cylinder. A spring compression mechanism is provided. The compression mechanism urges the piston towards the rear end of the cylinder and compresses the first compression spring. A latching mechanism is provided. The latching mechanism releasably retains the piston adjacent the rear end of the cylinder and retaining the first compression spring in a compressed state. When a user operates the cocking mechanism, the spring compression mechanism is operated, the piston is urged toward the rear end of the cylinder, the spring is compressed and the spring and the piston are retained by the latching mechanism until released. The release of the latching mechanism allows the piston to move rapidly toward the front end of the cylinder, providing a burst of compressed gas in the cylinder and to the connected chamber.

(4) In still another variant, the compressed gas release mechanism further comprises a trigger. The trigger is rotatably mounted to the stock and is urged in a counterclockwise direction by a trigger return spring. The trigger return spring is constrained by a first channel in the stock. The trigger has an upper protrusion. The upper protrusion engages an internal safety pivot. The safety pivot prevents release of the latching mechanism unless operation of the cocking mechanism is completed. The trigger has an elevating ramp located rearwardly of the upper protrusion. The elevating ramp urges a releasing bracket of the latching mechanism upwardly against a downwardly urging second compression spring as the trigger is pivoted in a clockwise direction.

The releasing bracket is pivotally mounted to the stock and has an upward pointing travel limiting arm located within a notch in the stock. The releasing bracket has a downwardly facing rib. The rib releasably engages an upwardly facing control notch in the main pole. The main pole is attached to the piston, has an upwardly angled ramp at a rear end located behind the control notch. The ramp guides the rib into the control notch. The main pole moves rearwardly in a second channel in the stock during operation of the cocking mechanism. The releasing bracket retains the main pole in a first, cocked position as the rib engages the control notch. The releasing bracket releases the main pole to a second, fired position as the trigger is pivoted in a clockwise direction elevating the releasing bracket and raising the rib from the control notch, allowing the main pole and the piston to move forward as urged by the first compression spring, pressurizing the cylinder.

(5) In yet another variant, the projectile storage magazine comprises a cylindrical chamber. The cylindrical chamber has first side and second side projectile loading slots. The loading slots extend from an upper edge of the cylindrical chamber to a base of the cylindrical chamber. The cylindrical chamber has a circular opening at a lower end. The lower end is fitted sealably to an upper end of a vertically oriented circular opening through the chamber. A rectangular projectile feeding tray is provided. The feeding tray surrounds the cylindrical chamber and provides additional space for particulate projectiles outside of the cylindrical chamber.

A hingedly attached sealing lid is provided. The sealing lid has first and second semi-circular ridges on an underside of the lid. The ridges are designed to surround upper edges of the cylindrical chamber adjacent the first side and second side projectile loading slots. The sealing lid has a peripheral channel on the underside. The peripheral channel is sized, shaped and located to seal the rectangular projectile feeding tray when the sealing lid is moved to a closed position. A lid latching mechanism is provided. The lid latching mechanism is located opposite a hinge for the sealing lid.

(6) In a further variant, the lower end of the cylindrical chamber is fitted sealably to the upper end of the vertically oriented circular opening through the chamber with a sealing washer.

(7) In still a further variant, the projectile loading mechanism comprises a metering rod. The metering rod is sized and shaped to fit sealably through the vertically oriented circular opening through the chamber and has an orthogonal activation bar that extends from a lower end of the metering rod and a through hole located above the activation bar. The through hole is orthogonal to the bar and the metering rod and sized and located to align with the chamber when the bar is positioned against a stopping surface. The activation bar is urged upwardly to rest against a lower end of the vertically oriented circular opening in the chamber by an anterior end of the pivotally mounted subordination pole.

A posterior end of the subordination pole is urged downwardly by an orthogonally mounted cylindrical pin located adjacent the posterior end. The pin is pushed downwardly as it travels in a track in a cam plate, the cam plate is affixed to the main pole and moves rearwardly as the main pole moves rearwardly during operation of the cocking mechanism. The through hole fills with the particulate projectiles when located above the chamber in the cylindrical chamber during operation of the cocking mechanism. The activation bar is urged downwardly by the pivotally mounted subordination pole to rest against the stopping surface during activation of the compressed gas release mechanism.

(8) In yet a further variation, the projectile loading mechanism further comprises a mid-chamber pipe. The pipe extends downwardly from the lower end of the cylindrical chamber. A trajectory guide is provided. The guide is located below the cylindrical chamber, has a hollow bore sized to fit slidably about the pipe and has a vertical slot extending downwardly from the lower end for a first predetermined distance and terminates in a stopping surface. The trajectory guide is located about the pipe and provides a support platform for attachment of the projectile storage magazine. The metering rod is cylindrical in shape and is sized to fit slidably within the pipe. The metering rod has the orthogonal activation bar which extends from the lower end thereof and the through hole located above the activation bar. The through hole is orthogonal to the activation bar and the metering rod and sized and located to align with the chamber when the bar is positioned against the stopping surface. The subordination pole is pivotally mounted to a cover of the compressed gas source. The anterior end of the subordination pole includes a metering slot.

The metering slot surrounds the activation bar. The posterior end of the subordination pole is urged downwardly by the cylindrical pin and cam plate to move the metering rod upwardly into the projectile storage magazine during operation of the cocking mechanism. The particulate projectiles fill the through hole of the metering rod as it moves in the projectile storage magazine surrounded by the particulate projectiles. The posterior end of the subordination pole is urged upwardly by the cylindrical pin and the cam plate during activation of the compressed gas release mechanism, the metering slot moves the activation bar downwardly, aligning the through hole with the chamber permitting the compressed gas source to drive the particulate projectiles out of the chamber and through the barrel.

(9) In another variant of the invention, the spring compression mechanism further comprises a primary gear rack. The gear rack is slidably located in a gear rack channel in the stock, has gear teeth located upon an upper surface and has mounting fixtures adjacent a forward end for attachment of a slide handle. A drive gear is provided. The drive gear is rotatably mounted to a cocking sled. The cocking sled moves slidably within the primary gear rack. A secondary gear rack is provided. The secondary gear rack is attached below the piston and is located above the drive gear. The primary gear rack engages the drive gear and the drive gear engages the secondary gear rack. Rearward movement of the slide handle moves the primary gear rack rearward, rotates the drive gear, and moves the cocking sled rearward, bearing against a cocking paddle on the main pole and moving the piston rearward, compressing the first compression spring.

(10) In still another variant, a spring-loaded cocking mechanism lock-out block is provided. The lockout block is pivotally mounted to an underside of the cover of the compressed gas source and has a pivoting ramp located on a first side edge, a retaining notch located forward of the pivoting ramp, a stepped angled cam orthogonally located above the pivoting ramp. The pivoting ramp slidably engages a rear surface of a vertical locking tab. The locking tab is affixed to a side rail of the cocking mechanism. The retaining notch moves to block rearward movement of the locking tab as the notch moves past the tab during forward movement of the cocking mechanism, thereby preventing a second activation of the cocking mechanism. A cam activating rod is provided. The activating rod is affixed to the subordination pole, adjacent the anterior end and rearward of the metering slot. The cam activating rod bears on the stepped angled cam during activation of the compressed gas release mechanism and causes the lock-out block to pivot inwardly, causing the retaining notch to disengage from the rear surface of the locking tab, thereby permitting activation of the cocking mechanism.

(11) In yet another variation, a control pin is provided. The control pin is attached to a first end of an internal safety pivot. The control pin moves in a slot in the cocking sled. The control pin maintains the first end of the internal safety pivot in an elevated position during rearward movement of the cocking sled, causing a second end of the pivot, to engage an upper protrusion at an upper end of the trigger of the compressed gas release mechanism, thereby preventing activation of the compressed gas release mechanism. The control pin causes downward movement of the first end of the internal safety pivot to a lowered position upon completion of forward movement of the cocking sled. The downward movement permits release of the upper protrusion of the trigger and permits activation of the gas release mechanism.

(12) In a further variant, the support stock further comprises a sight glass. The sight glass is positioned adjacent the magazine and permits a view of a level of the particulate projectiles contained in the magazine.

(13) In still a further variant, an automatic cocking status indicator is provided. The cocking status indicator moves to a raised, visible position after cocking of the gun and moves to a lowered, hidden position after discharge of the gun.

(14) In yet a further variant, an external, manual safety mechanism is provided. The manual safety mechanism is movable from a safe position to a firing position by a user while maintaining a grip on the gun.

(15) In another variant of the invention, the gun uses a prefilled $CO_2$ cartridge as a compressed gas source, the gun further comprises a cylindrical cartridge chamber. The cartridge chamber is sized and shaped to enclose the $CO_2$ cartridge, has a sealable opening at a first end for introduction of the cartridge and a concave seat located at a second end. The seat is sized and shaped to fit sealably about a discharging end of the cartridge. A hollow puncturing needle is located within the seat. A sealing cap is provided. The cap is removably attached to the cartridge chamber by mating screw threads. Tightening of the cap urges the cartridge against the puncturing needle.

A pressure vessel is provided. The pressure vessel is fluidly connected to a metering device. The metering device permits a predetermined charge of compressed gas to enter the chamber upon activation of the compressed gas release mechanism.

(16) In still another variant, the compressed gas release mechanism further comprises a trigger. The trigger is rotatably mounted to the stock and urged in a counter-clockwise direction by a trigger return spring. The trigger return spring is constrained by a first channel in the stock. The trigger has an upper protrusion. The upper protrusion engages an internal safety pivot. The safety pivot prevents prevents release of the latching mechanism unless operation of the cocking mechanism is completed.

The trigger has an elevating ramp located rewardly of the upper protrusion. The elevating ramp urges a releasing bracket of the latching mechanism upwardly against a downwardly urging second compression spring as the trigger is pivoted in a clockwise direction. The releasing bracket is pivotally mounted to the stock and has an upward pointing travel limiting arm located within a notch in the stock. The releasing bracket and has a downwardly facing rib. The rib releasably engages an upwardly facing control notch in a loading rod. The loading rod is urged forward by a loading coil spring. The loading rod has an upwardly angled ramp at a rear end, located behind the control notch. The ramp guides the rib into the control notch. The loading rod moves rearwardly in a loading rod channel in the stock during operation of the cocking mechanism. The releasing bracket retains the loading rod in a first, cocked position as the rib engages the control notch and releases the loading rod to a second, fired position as the trigger is pivoted in a clockwise direction elevating the releasing bracket and raising the rib from the control notch, allowing the loading rod to move forward as urged by the loading coil spring, activating the projectile loading mechanism and the metering device.

(17) In yet another variant, the gun uses a pneumatically pumped air reservoir as a compressed gas source, the gun further comprises a gas cylinder. The cylinder has an inlet valve and an outlet valve. A piston is provided. The piston fits sealably within the cylinder. A pumping mechanism is provided. The pumping mechanism is mechanically linked to the piston. The pumping mechanism moves the piston from an extended position to a compressed position within the cylinder. The inlet valve is in an open position as the piston moves from the compressed position to the extended position and is in a closed position as the piston moves from the extended position to the compressed position. The outlet valve is in a closed position as the piston moves from the compressed position to the extended position and is in an open position as the piston moves from the extended position to the compressed position. The air reservoir is fluidly connected to the outlet valve, the chamber and a metering device. The metering device permits a predetermined charge of compressed gas to enter the chamber upon activation of the compressed gas release mechanism. Repeated movement of the piston by the pumping mechanism from the extended position to the compressed position within the cylinder will increase pressure within the air reservoir, permitting the particulate projectiles to be ejected from the chamber with increased force upon release of the pressure by the compressed gas release mechanism.

(18) In a further variant, the compressed gas release mechanism further comprises a trigger. The trigger is rotatably mounted to the stock and urged in a counter-clockwise direction by a trigger return spring. The trigger return spring is constrained by a first channel in the stock. The trigger has an upper protrusion. The upper protrusion engages an internal safety pivot. The safety pivot prevents prevents release of the latching mechanism unless operation of the cocking mechanism is completed.

The trigger has an elevating ramp located rewardly of the upper protrusion. The elevating ramp urges a releasing bracket of the latching mechanism upwardly against a downwardly urging second compression spring as the trigger is pivoted in a clockwise direction. The releasing bracket is pivotally mounted to the stock and has an upward pointing travel limiting arm located within a notch in the stock. The releasing bracket and has a downwardly facing rib. The rib releasably engages an upwardly facing control notch in a loading rod. The loading rod is urged forward by a loading coil spring. The loading rod has an upwardly angled ramp at a rear end, located behind the control notch. The ramp guides the rib into the control notch. The loading rod moves rearwardly in a loading rod channel in the stock during operation of the cocking mechanism. The releasing bracket retains the loading rod in a first, cocked position as the rib engages the control notch and releases the loading rod to a second, fired position as the trigger is pivoted in a clockwise direction elevating the releasing bracket and raising the rib from the control notch, allowing the loading rod to move forward as urged by the loading coil spring, activating the projectile loading mechanism and the metering device.

(19) In still a further variant, the gun uses a refillable compressed gas cylinder as a compressed gas source, the gun further comprises a refillable compressed gas cylinder. The cylinder has a shut off valve and an attachment fitting located adjacent a first end. A mating attachment fitting is provided. The mating fitting is mounted to the stock and is fluidly connected to a metering device. The metering device is fluidly connected to the chamber and the metering device permits a predetermined charge of compressed gas to enter the chamber upon activation of the compressed gas release mechanism. When a charged refillable compressed gas cylinder is attached to the mating attachment fitting the shut off valve is opened and the compressed gas is released by the metering device upon activation of the compressed gas release mechanism.

(20) In yet a further variant, the compressed gas release mechanism further comprises a trigger. The trigger is rotatably mounted to the stock and urged in a counter-clockwise direction by a trigger return spring. The trigger return spring is constrained by a first channel in the stock. The trigger has an upper protrusion. The upper protrusion engages an internal safety pivot. The safety pivot prevents prevents release of the latching mechanism unless operation of the cocking mechanism is completed.

The trigger has an elevating ramp located rewardly of the upper protrusion. The elevating ramp urges a releasing bracket of the latching mechanism upwardly against a downwardly urging second compression spring as the trigger is pivoted in a clockwise direction. The releasing bracket is pivotally mounted to the stock and has an upward pointing travel limiting arm located within a notch in the stock. The releasing bracket and has a downwardly facing rib. The rib releasably engages an upwardly facing control notch in a loading rod. The loading rod is urged forward by a loading coil spring. The loading rod has an upwardly angled ramp at a rear end, located behind the control notch. The ramp guides the rib into the control notch. The loading rod moves rearwardly in a loading rod channel in the stock during operation of the cocking mechanism. The releasing bracket retains the loading rod in a first, cocked position as the rib engages the control notch and releases the loading rod to a second, fired position as the trigger is pivoted in a clockwise direction elevating the releasing bracket and raising the rib from the control notch, allowing the loading rod to move forward as urged by the loading coil spring, activating the projectile loading mechanism and the metering device.

(21) In another variant of the invention, the gun uses an external compressed gas line as a compressed gas source, the gun further comprises an external compressed gas line. The compressed gas line is connected to a compressed gas source and has a shut off valve and an attachment fitting located adjacent a first end. A mating attachment fitting is provided. The mating fitting is mounted to the support stock and is fluidly connected to a metering device. The metering device is fluidly connected to the chamber and the metering device permits a predetermined charge of compressed gas to enter the chamber upon activation of the compressed gas release mechanism. When the external compressed gas line is attached to the mating attachment fitting, the shut off valve is opened and the compressed gas is released by the metering device upon activation of the compressed gas release mechanism.

(22) In still another variant, the compressed gas release mechanism further comprises a trigger. The trigger is rotatably mounted to the stock and urged in a counter-clockwise direction by a trigger return spring. The trigger return spring is constrained by a first channel in the stock. The trigger has an upper protrusion. The upper protrusion engages an internal safety pivot. The safety pivot prevents prevents release of the latching mechanism unless operation of the cocking mechanism is completed.

The trigger has an elevating ramp located rewardly of the upper protrusion. The elevating ramp urges a releasing bracket of the latching mechanism upwardly against a downwardly urging second compression spring as the trigger is pivoted in a clockwise direction. The releasing bracket is pivotally mounted to the stock and has an upward pointing travel limiting arm located within a notch in the stock. The releasing bracket and has a downwardly facing rib. The rib releasably engages an upwardly facing control notch in a loading rod. The loading rod is urged forward by a loading coil spring. The loading rod has an upwardly angled ramp at a rear end, located behind the control notch. The ramp guides the rib into the control notch. The loading rod moves rearwardly in a loading rod channel in the stock during operation of the cocking mechanism. The releasing bracket retains the loading rod in a first, cocked position as the rib engages the control notch and releases the loading rod to a second, fired position as the trigger is pivoted in a clockwise direction elevating the releasing bracket and raising the rib from the control notch, allowing the loading rod to move forward as urged by the loading coil spring, activating the projectile loading mechanism and the metering device.

(23) In yet another variant, a pistol grip and a forearm of the stock have flattened lower surfaces. The flattened surfaces permit the bug killing gun to be balanced in an upright position for adding the particulate projectiles to the projectile storage magazine.

(24) In a further variant, a laser sighting device is provided. The laser sighting device comprises a battery powered laser. The laser is capable of producing a laser aiming spot. A housing is provided. The housing is adapted to contain the laser, a battery power source and a control circuit for the laser. An attachment mechanism is provided. The attachment mechanism is adapted to attach the laser sighting device adjacent a distal end of the barrel.

(25) In still a further variant, the attachment mechanism is integrally formed with the distal end of the barrel.

(26) In yet a further variant, the attachment mechanism is adapted to removably attach the laser sighting device to the distal end of the barrel.

(27) In another variant of the invention, the laser sighting device further comprises elevation and windage adjustments for an aiming point of the laser aiming spot.

(28) In still another variant, a power switch is provided. The switch controls power to the laser.

(29) In yet another variant, the power switch is mounted on the housing.

(30) In a final variant, the power switch is integral with the trigger, wherein initial rearward movement of the trigger completes a circuit within the power switch, thereby providing the laser aiming spot prior to activation of the compressed gas release mechanism.

An appreciation of the other aims and objectives of the present invention and an understanding of it may be achieved by referring to the accompanying drawings and the detailed description of a preferred embodiment.

DESCRIPTION OF THE DRAWINGS

FIG. 17 is an exploded perspective view of a removable version of the laser sighting device including details of the assembly and aiming controls;

FIG. 18 is a detailed view of a trigger-operated on/off switch;

DETAILED DESCRIPTION OF THE PREFERRED EMBODIMENT (1) FIG. 1-23 illustrate a bug killing gun 10 providing the desired features may be constructed from the following components. As illustrated in FIGS. 2, 3, 11, 12 and 19-23, a compressed gas source 14 is provided. A chamber 18 is provided. The chamber 18 is fluidly connected to the compressed gas source 14. A barrel 22 is provided. The barrel 22 is located at a distal end 26 of the chamber 18. A compressed gas release mechanism 30 is provided. The release mechanism 30 is connected to the compressed gas source 14. A projectile storage magazine 34 is provided. The magazine 34 stores particulate projectiles 38 and is located adjacent the chamber 18.

Figure 1:
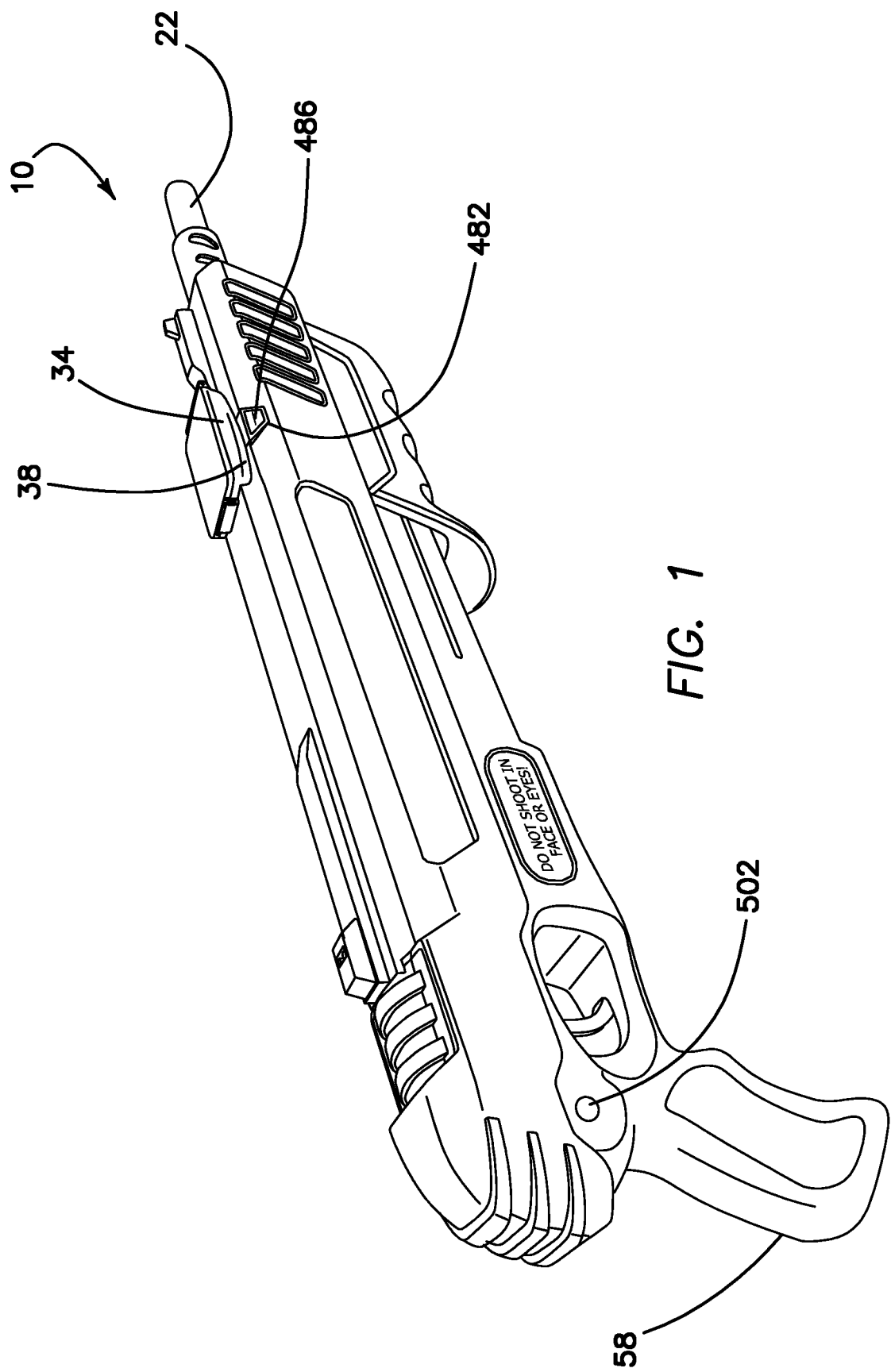
FIG. 1 is a perspective view of the preferred embodiment of the invention including an illustration of the magazine and sight glass.
Figure 2:
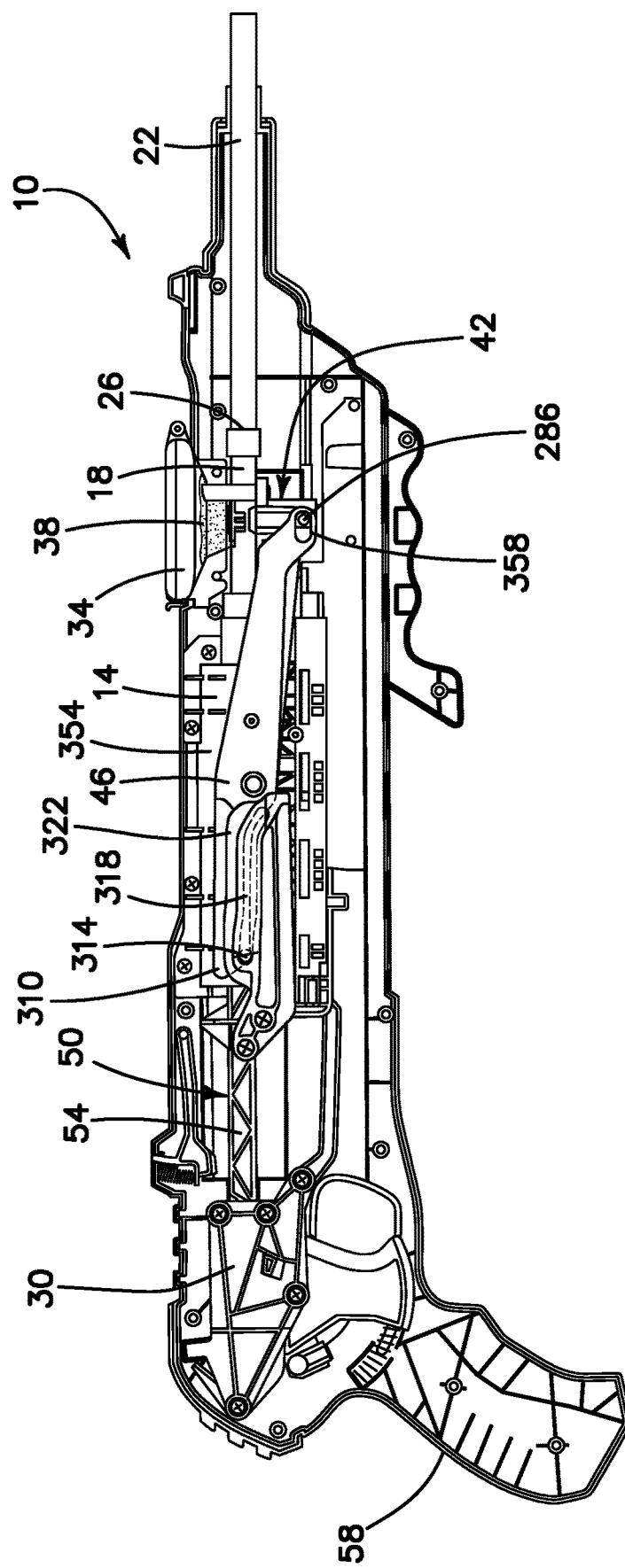
FIG. 2 is a side elevational cross-section of the FIG. 1 embodiment illustrating the projectile loading mechanism in the firing position.
Figure 2A:
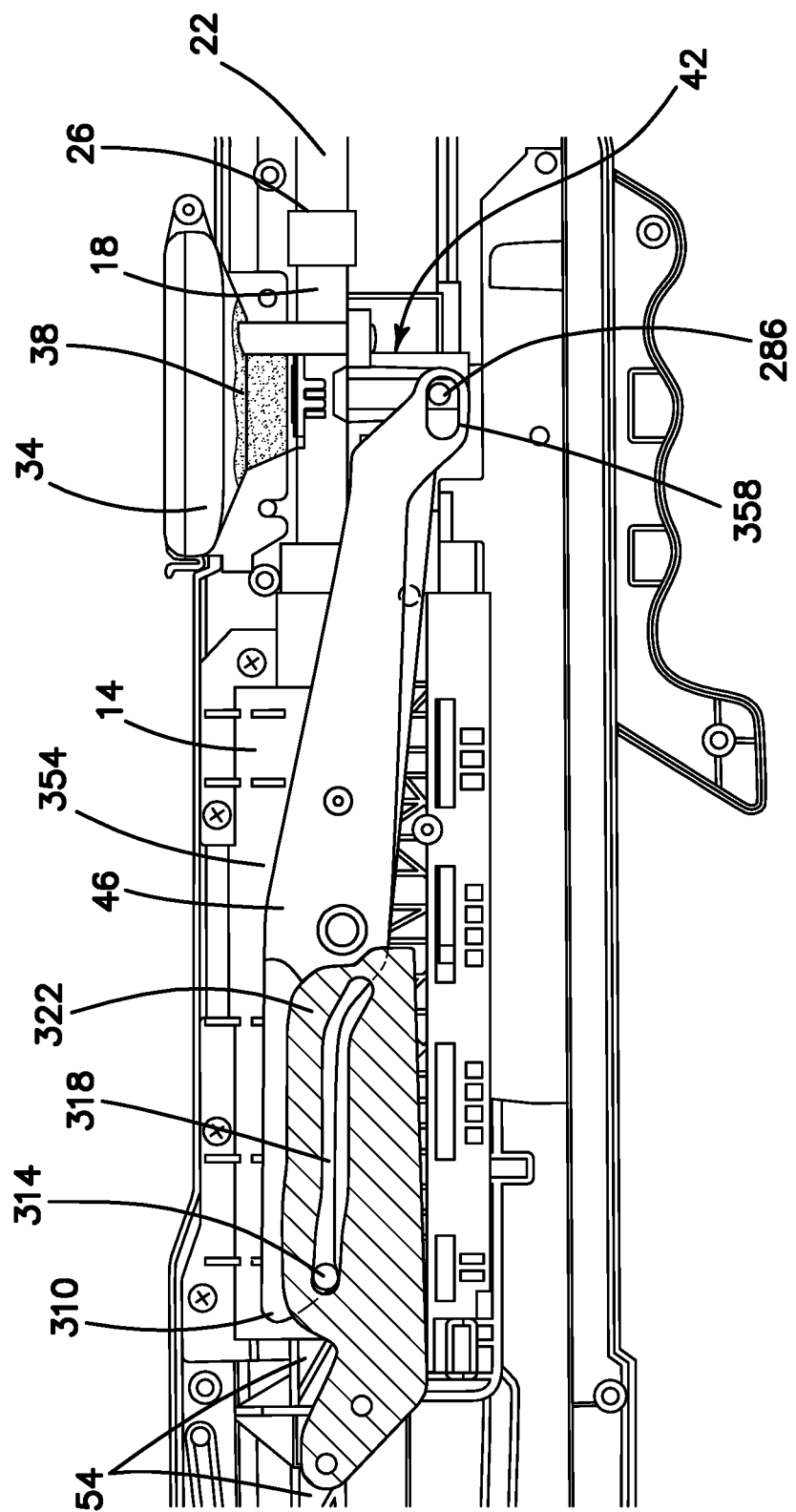
FIG. 2A is an enlarged partial side elevational cross-section of the FIG. 1 embodiment illustrating the pivotally mounted subordination pole with the metering slot and the cam in the firing position.
Figure 2B:
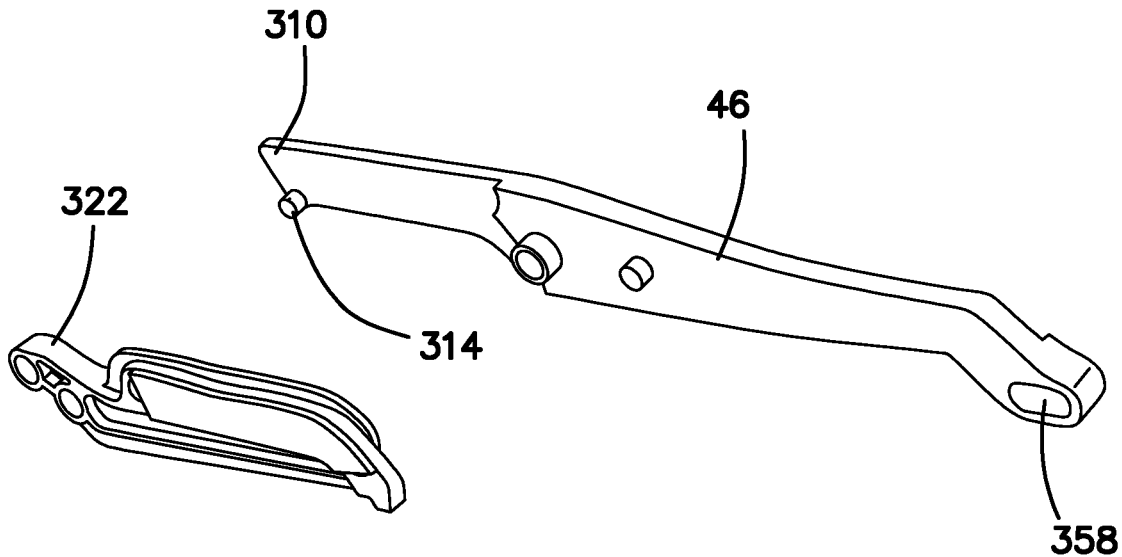
FIG. 2B is a perspective view of the subordination pole and cam from a first side illustrating the cylindrical pin that moves in the slot on the cam and the metering slot.
Figure 2C:
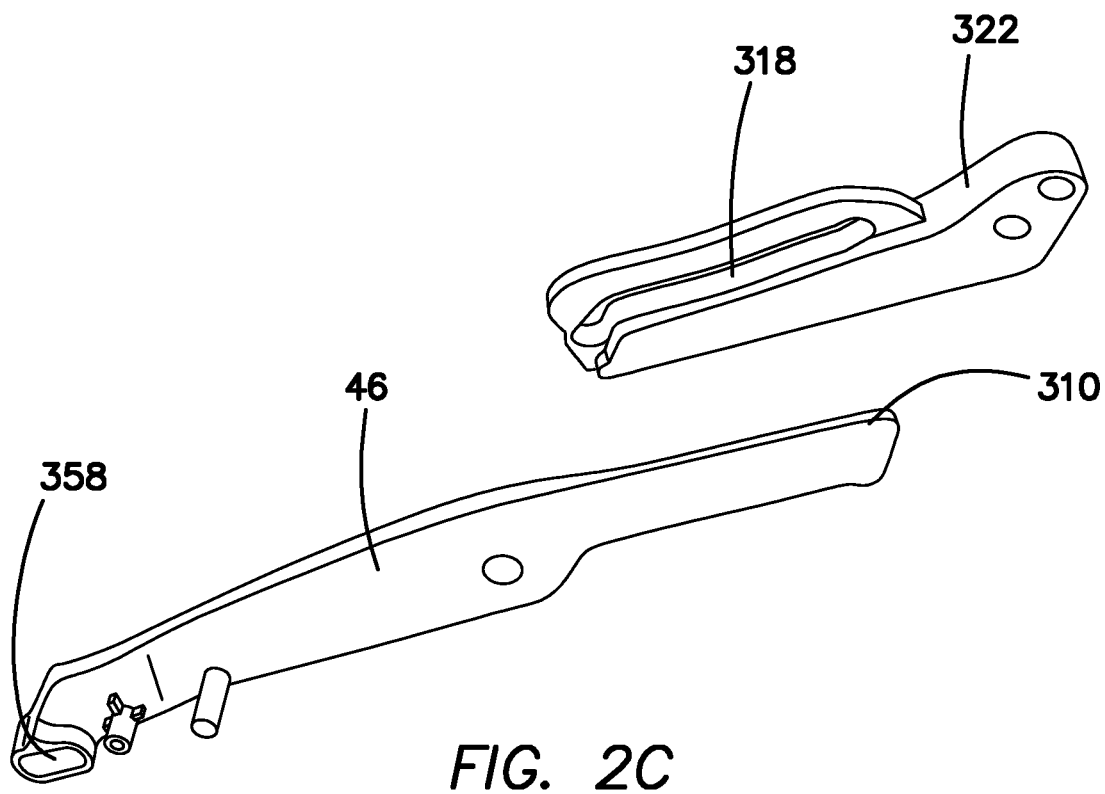
FIG. 2C is a perspective view of the subordination pole and cam from a second side illustrating the slot on the cam.
Figure 3:
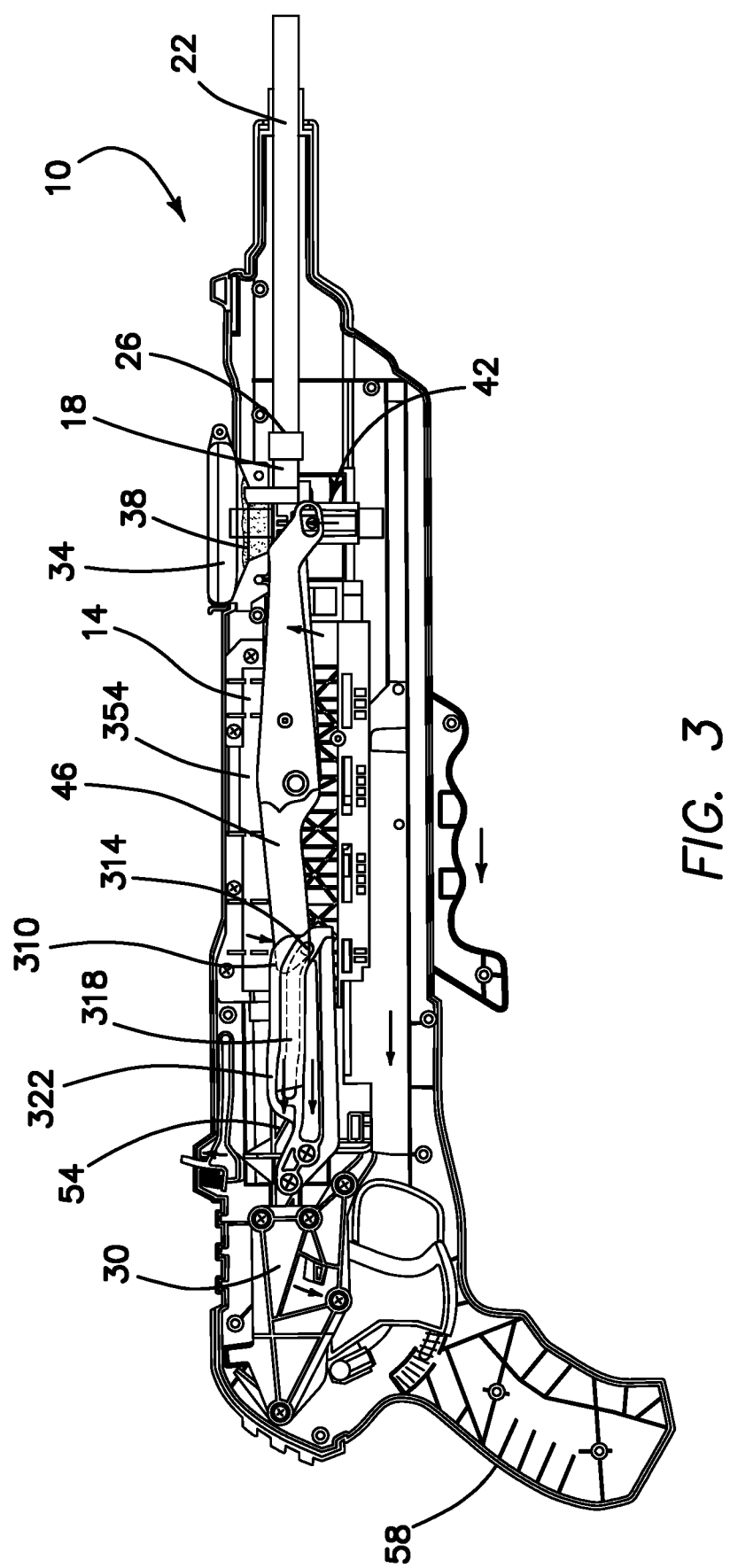
FIG. 3 is a side elevational cross-section of the FIG. 1 embodiment illustrating the projectile loading mechanism in the loading position.
Figure 3A:
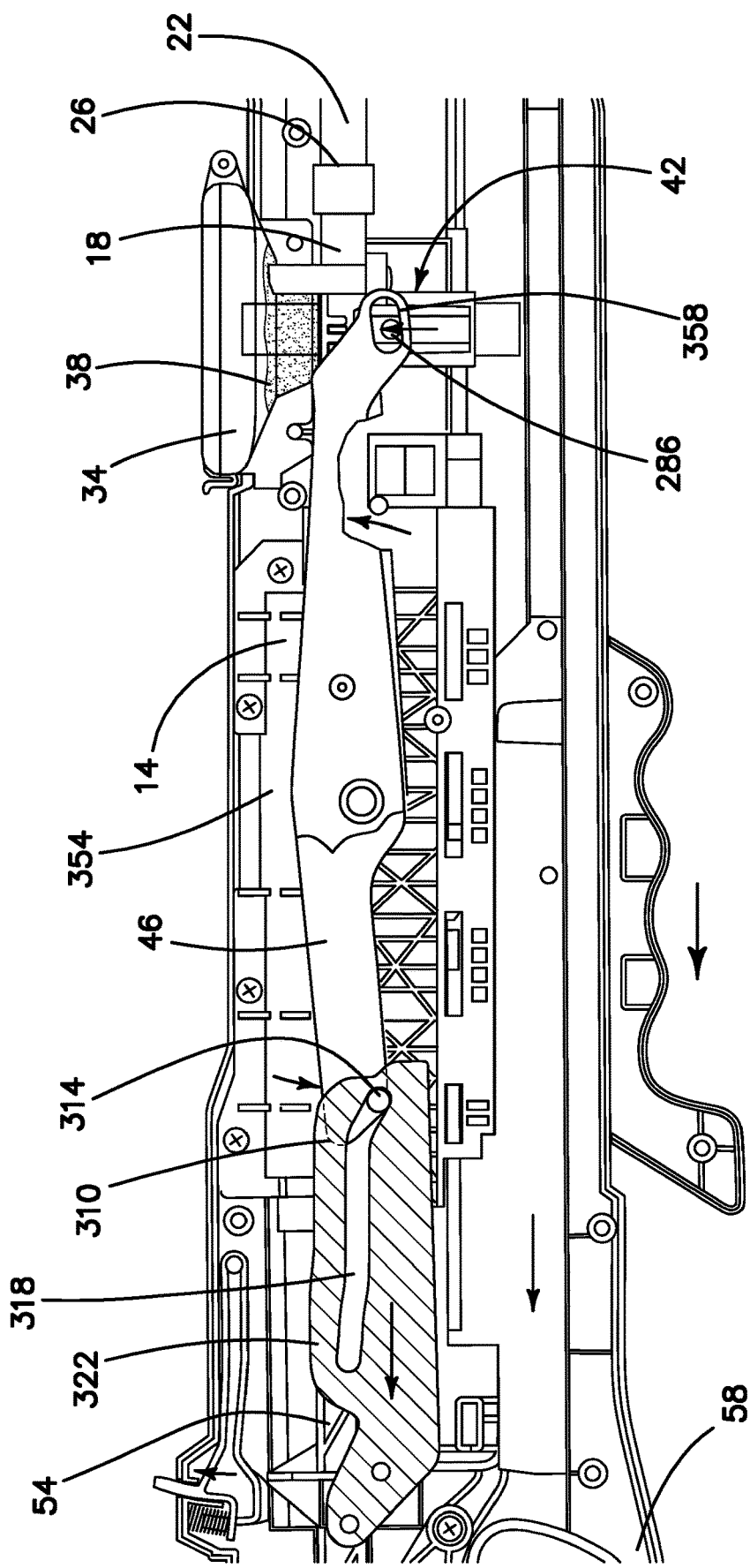
FIG. 3A is a side elevational cross-section of the FIG. 1 embodiment illustrating the pivotally mounted subordination pole with the metering slot and the cam in the loading position.
Figure 3B:
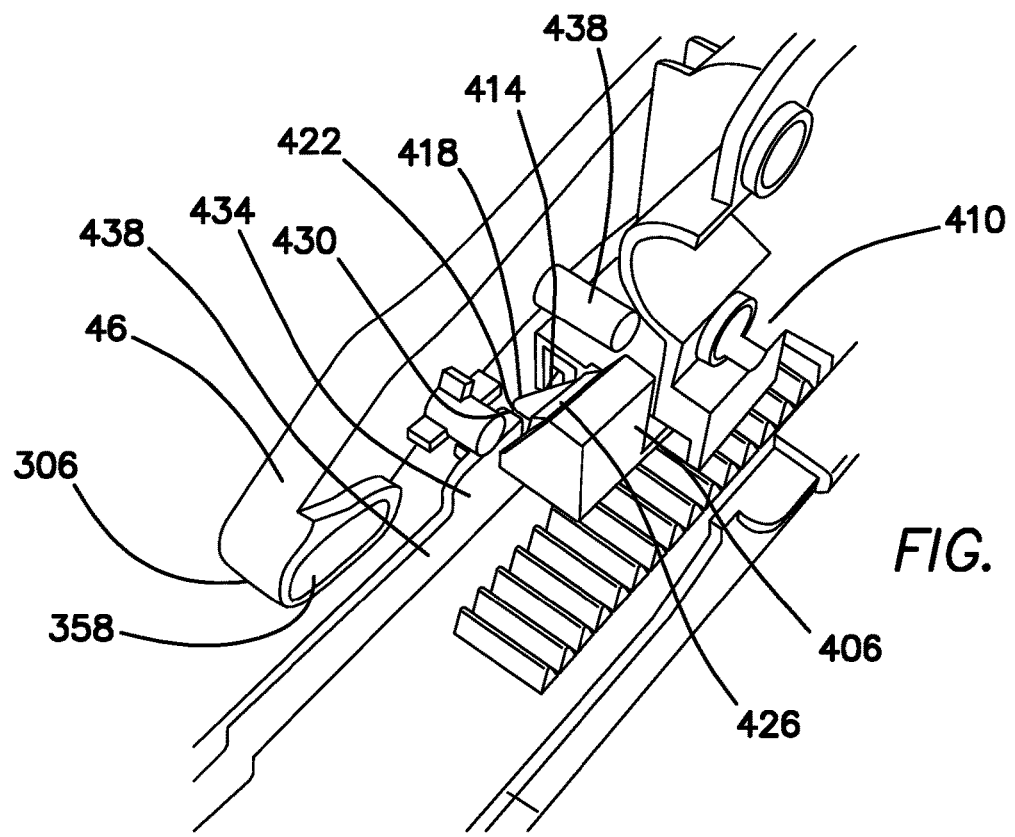
FIG. 3B is a detailed perspective view of the spring-loaded cocking mechanism lock-out block and vertical locking tab with retaining notch in the blocked position.
Figure 3C:
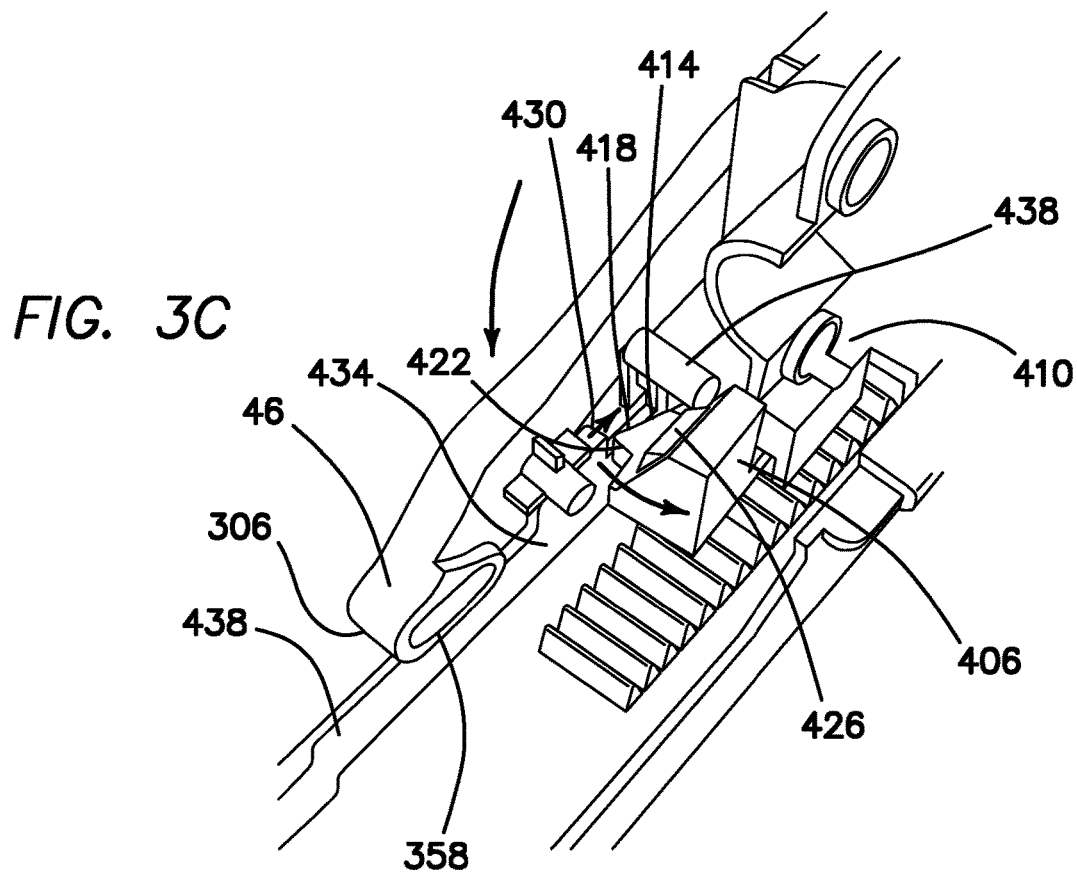
FIG. 3C is a detailed perspective view of the spring-loaded cocking mechanism lock-out block and vertical locking tab with retaining notch in the unblocked position.
Figure 3D:
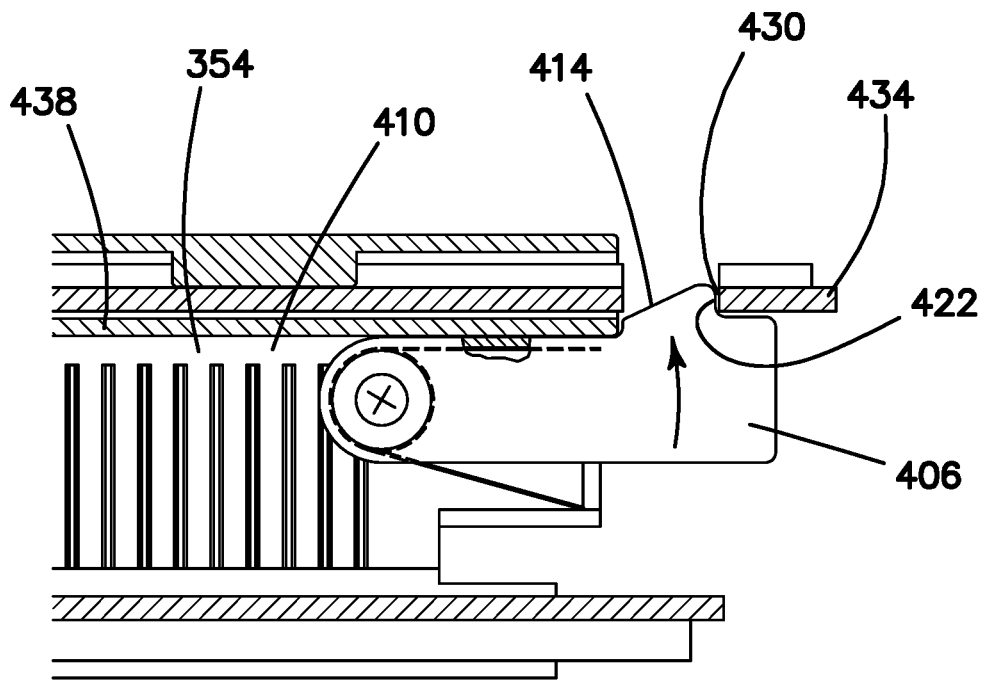
FIG. 3D is an enlarged cross-sectional view of the spring-loaded cocking mechanism lock-out block and vertical locking tab with retaining notch in the blocked position as seen from below.
Figure 3E:
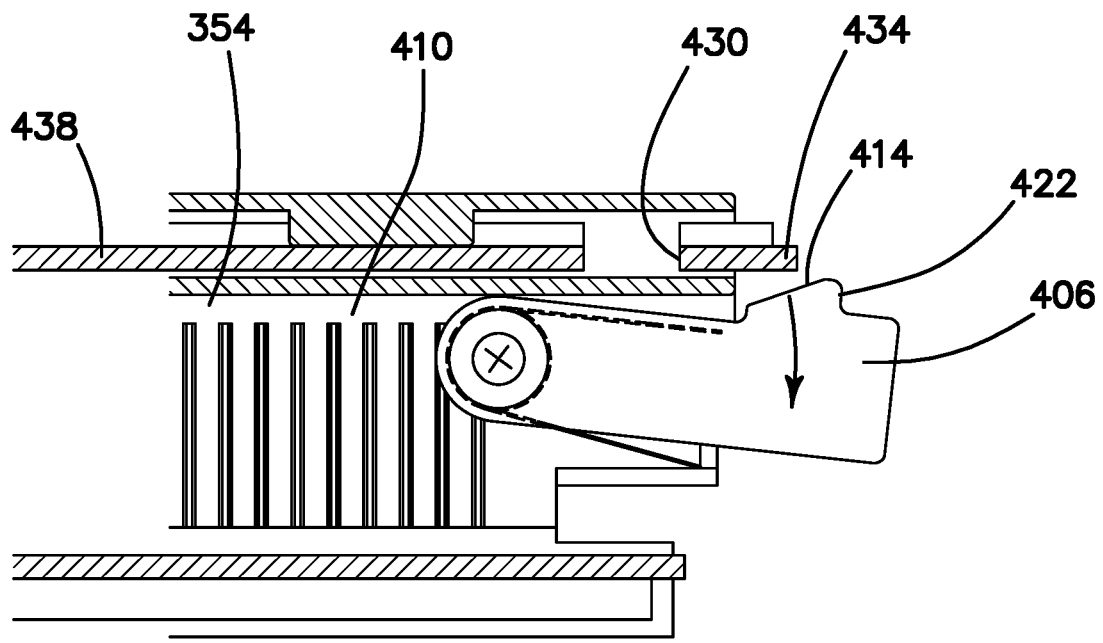
FIG. 3E is an enlarged cross-sectional view of the spring-loaded cocking mechanism lock-out block and vertical locking tab with retaining notch in the unblocked position as seen from below.

A projectile loading mechanism 42 is provided. The loading mechanism 42 moves the particulate projectiles 38 into the chamber 18 from the magazine 34 using a bi-directional cam-operated pivotally mounted subordination pole 46. A cocking mechanism 50 that has a main pole 54 is provided. The cocking mechanism 50 is mechanically connected to the compressed gas source 14, the compressed gas release mechanism 30, and the projectile loading mechanism 42. A stock 58 is provided. The stock 58 houses and supports the compressed gas source 14, the compressed gas release mechanism 30, the barrel 22, the chamber 18, the projectile storage magazine 34, the cocking mechanism 50 and the projectile loading mechanism 42. When the gun 10 is cocked with the cocking mechanism 50, the projectile loading mechanism 42 gathers a predetermined quantity of the particulate projectiles 38 and positions the projectiles 38 in the chamber 18. When the compressed gas release mechanism 30 is activated the projectiles 38 are ejected from the chamber 18 into the barrel 22 and expelled from the gun 10.

(2) In a variant of the invention, as illustrated in FIGS. 19-23, the compressed gas source 14 is selected from the group comprising a prefilled $CO_2$ cartridge 62, a refillable compressed gas cylinder 66, a pneumatically pumped gas reservoir 70, a spring-activated compressed gas system 74 and an external compressed gas line 78.

(3) In another variant, as Illustrated in FIGS. 4-6 and 11-12, the spring-activated compressed gas system 74 further comprises a cylinder 82. The cylinder 82 has a front end 86 and a rear end 90 and is fluidly connected to the chamber 18 at the front end 86. A piston 94 is provided. The piston 90 fits sealably in the cylinder 82 and is located therein. A first compression spring 98 is provided. The first compression spring 98 urges the piston 90 toward the front end 86 of the cylinder 82. A spring compression mechanism 102 is provided. The compression mechanism 102 urges the piston 94 towards the rear end 90 of the cylinder 82 and compresses the first compression spring 98. A latching mechanism 106 is provided. The latching mechanism 106 releasably retains the piston 94 adjacent the rear end 90 of the cylinder 82 and retaining the first compression spring 98 in a compressed state 110. When a user 114 operates the cocking mechanism 50, the spring compression mechanism 102 is operated, the piston 94 is urged toward the rear end 90 of the cylinder 82, the spring 98 is compressed and the spring 98 and the piston 94 are retained by the latching mechanism 106 until released. The release of the latching mechanism 106 allows the piston 94 to move rapidly toward the front end 86 of the cylinder 82, providing a burst of compressed gas 118 in the cylinder 82 and to the connected chamber 18.

Figure 4:
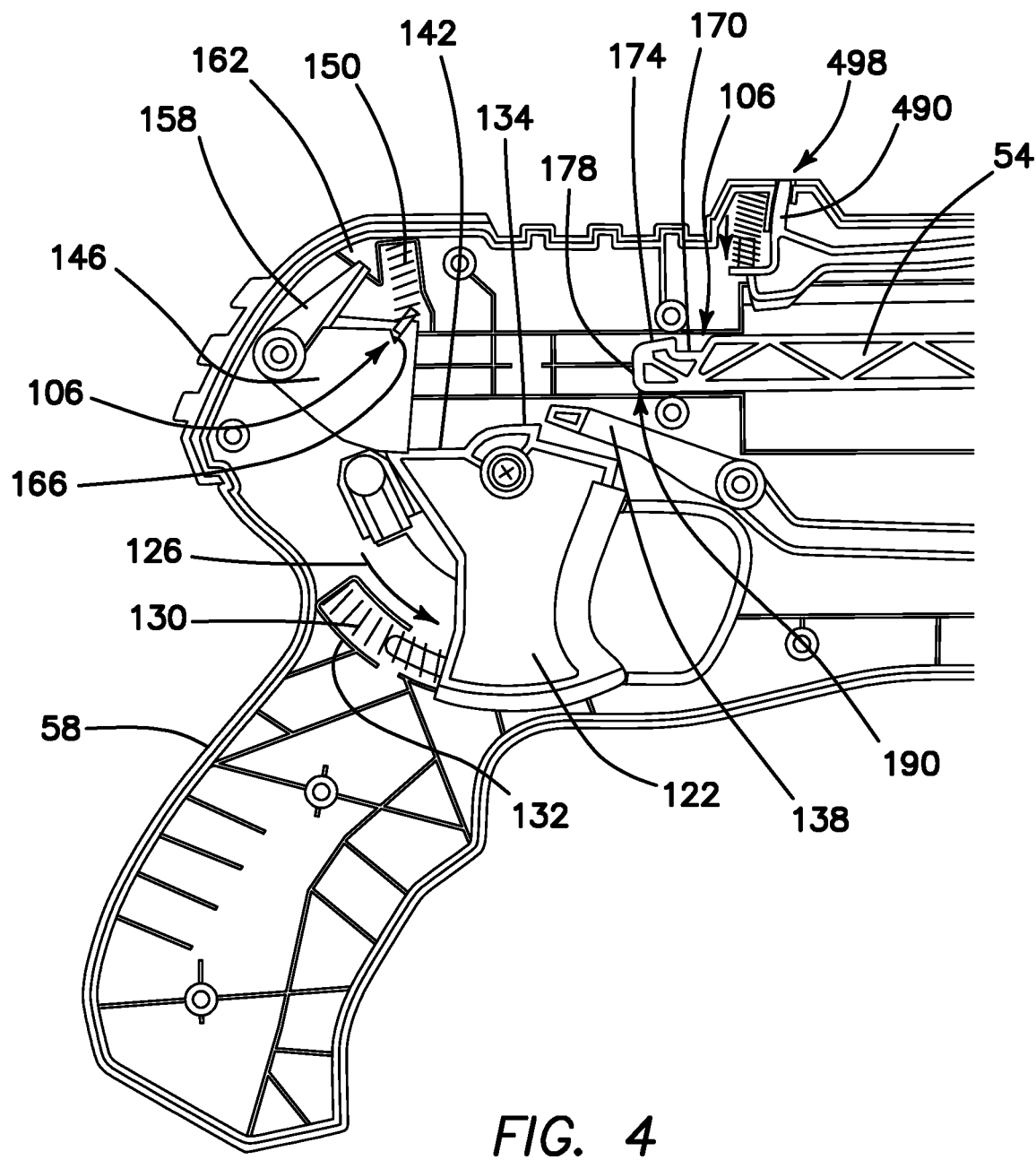
FIG. 4 is a partial side elevational cross-section of the FIG. 1 embodiment illustrating details of the trigger and latching mechanism after the gun has been fired.
Figure 5:
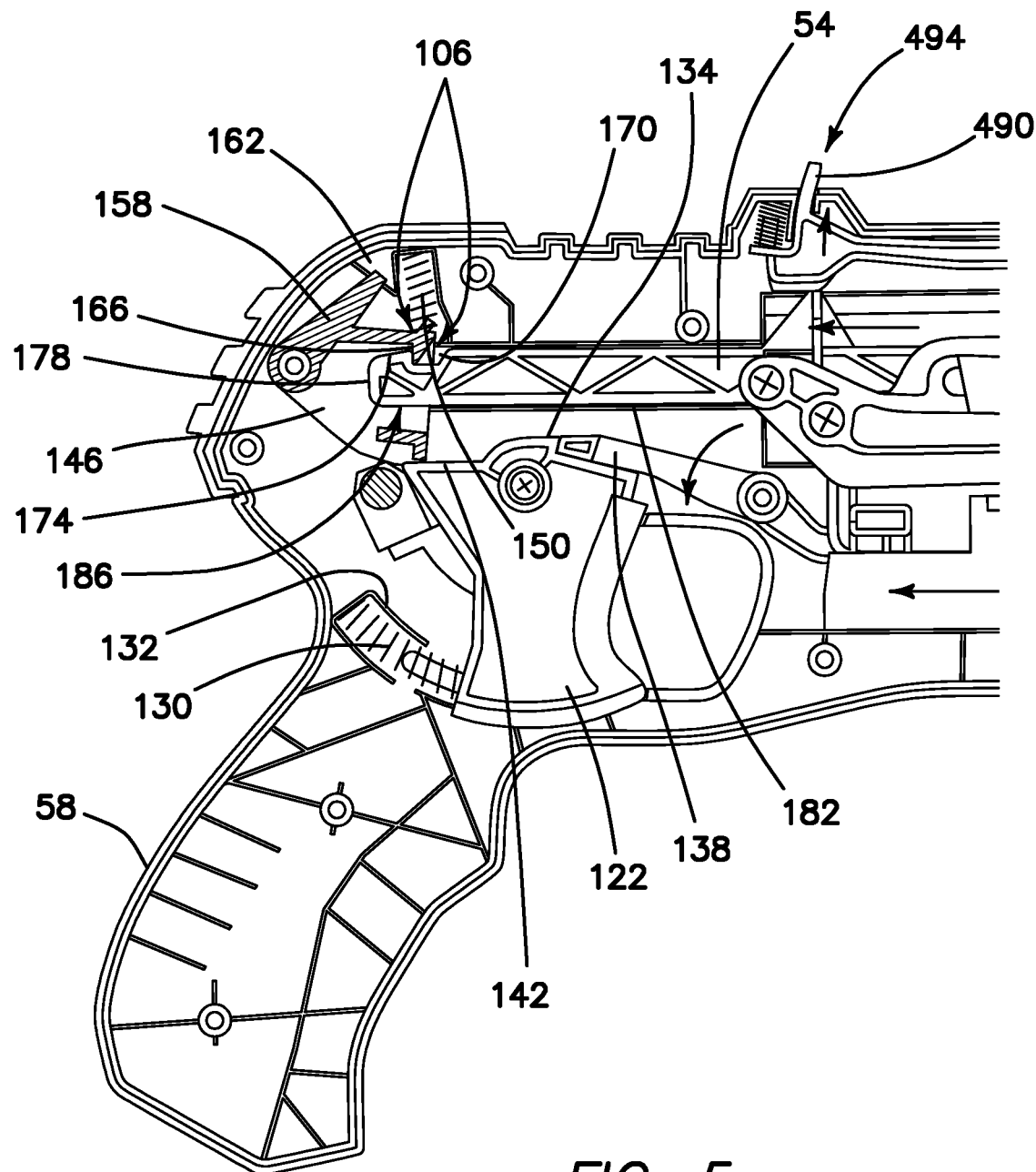
FIG. 5 is a partial side elevational cross-section of the FIG. 1 embodiment illustrating details of the trigger and latching mechanism with the gun ready to be fired.
Figure 6:
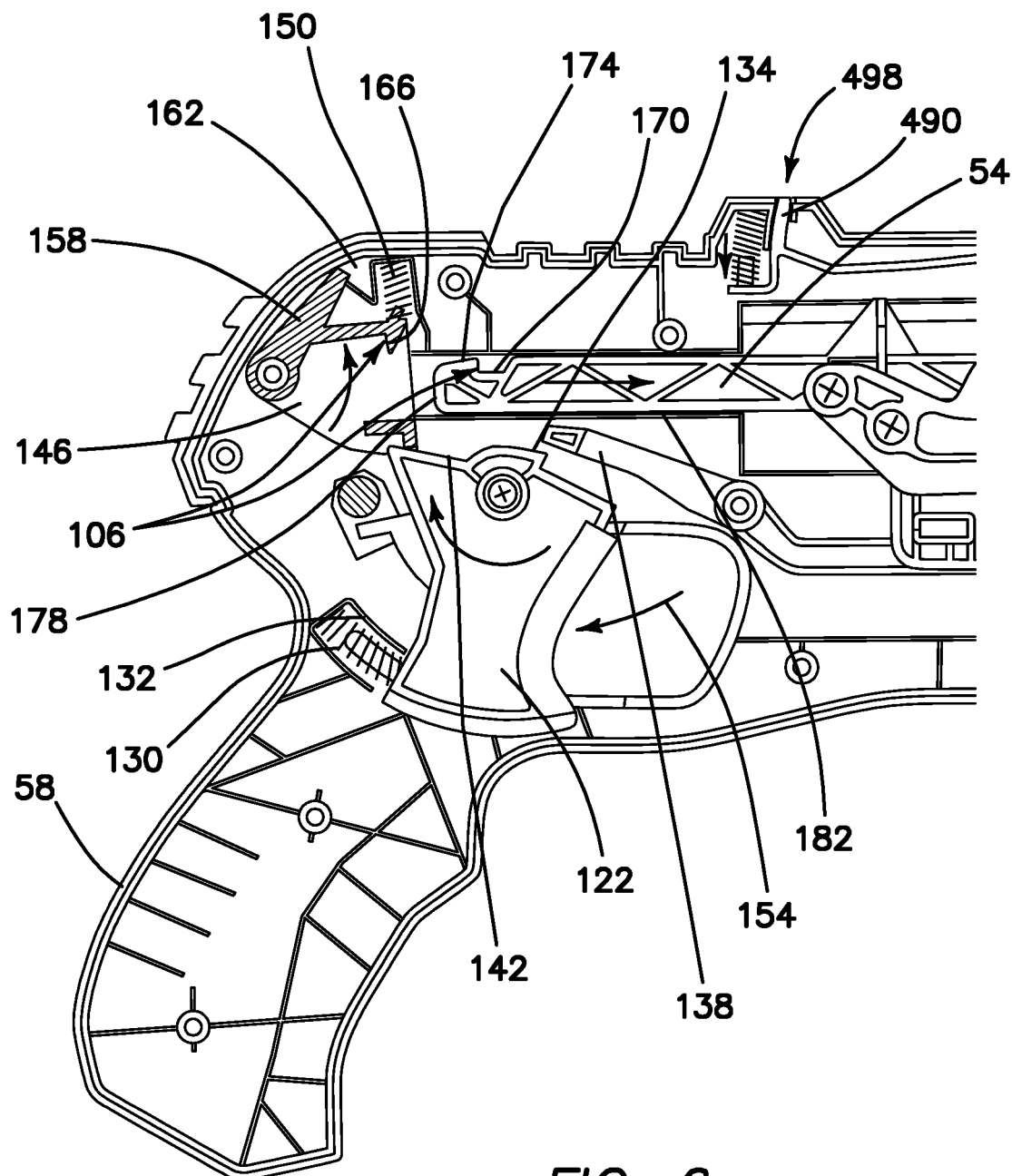
FIG. 6 is a partial side elevational cross-section of the FIG. 1 embodiment illustrating details of the trigger and latching mechanism illustrating movement of the mechanism as the gun is fired.
Figure 7:
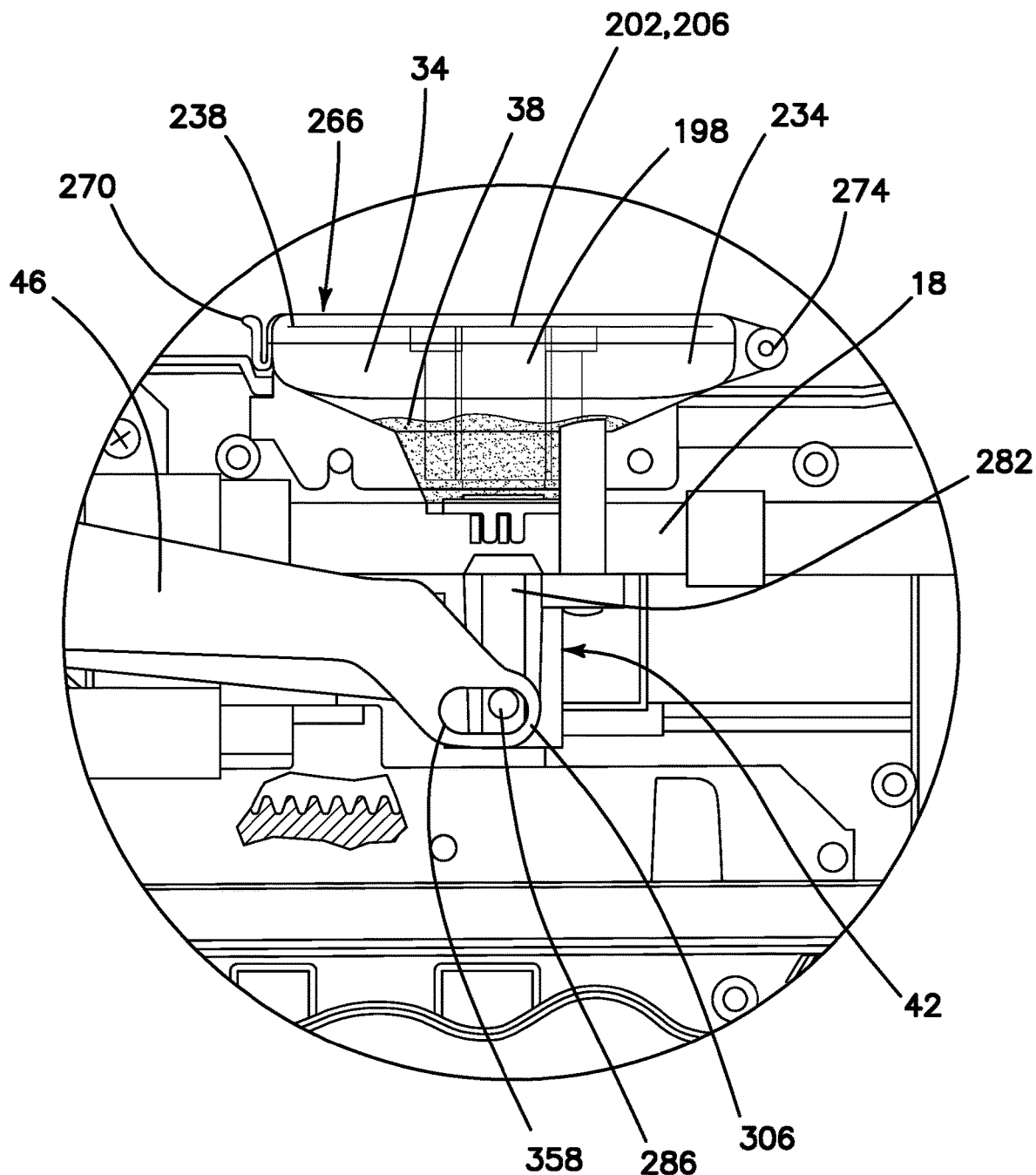
FIG. 7 is an enlarged side elevational cross-section of the FIG. 1 embodiment illustrating the projectile loading mechanism in the firing position with the subordination pole and metering slot in lowered position.
Figure 8:
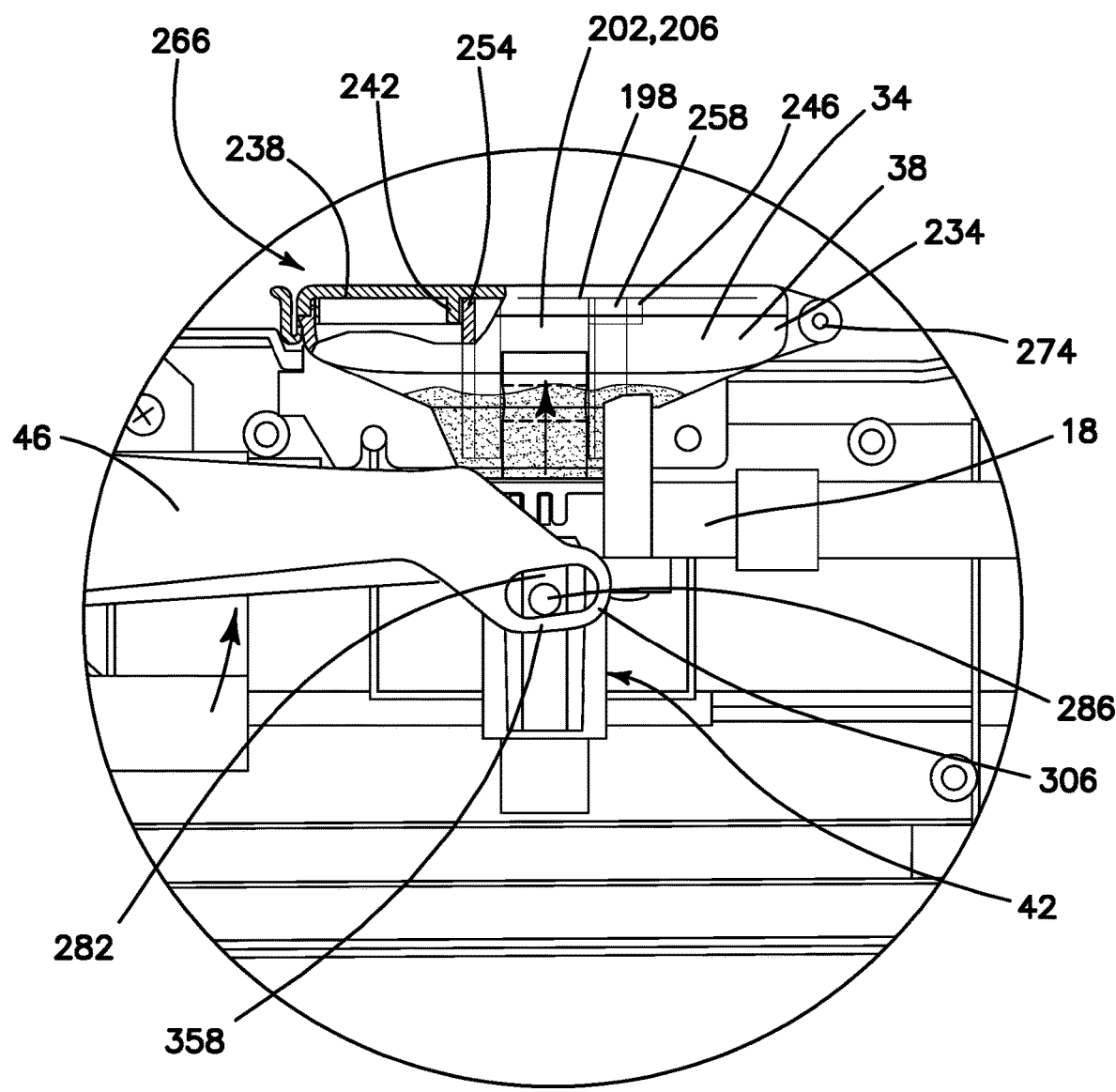
FIG. 8 is an enlarged side elevational cross-section of the FIG. 1 embodiment illustrating the projectile loading mechanism in the loading position with the subordination pole and metering slot in raised position.
Figure 9:
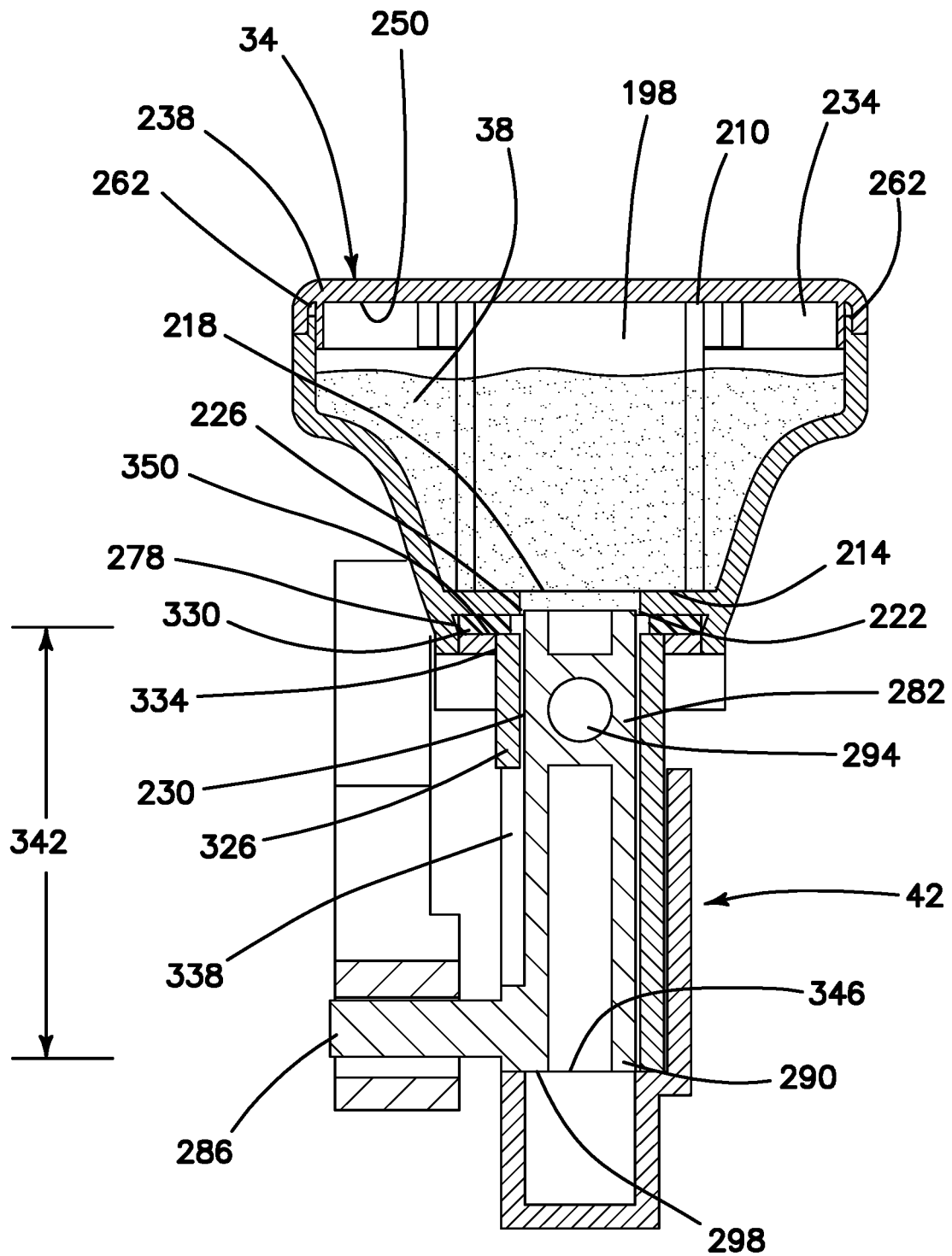
FIG. 9 is an orthogonal cross-sectional detailed view of the projectile storage magazine and projectile loading mechanism in the firing position.
Figure 10:
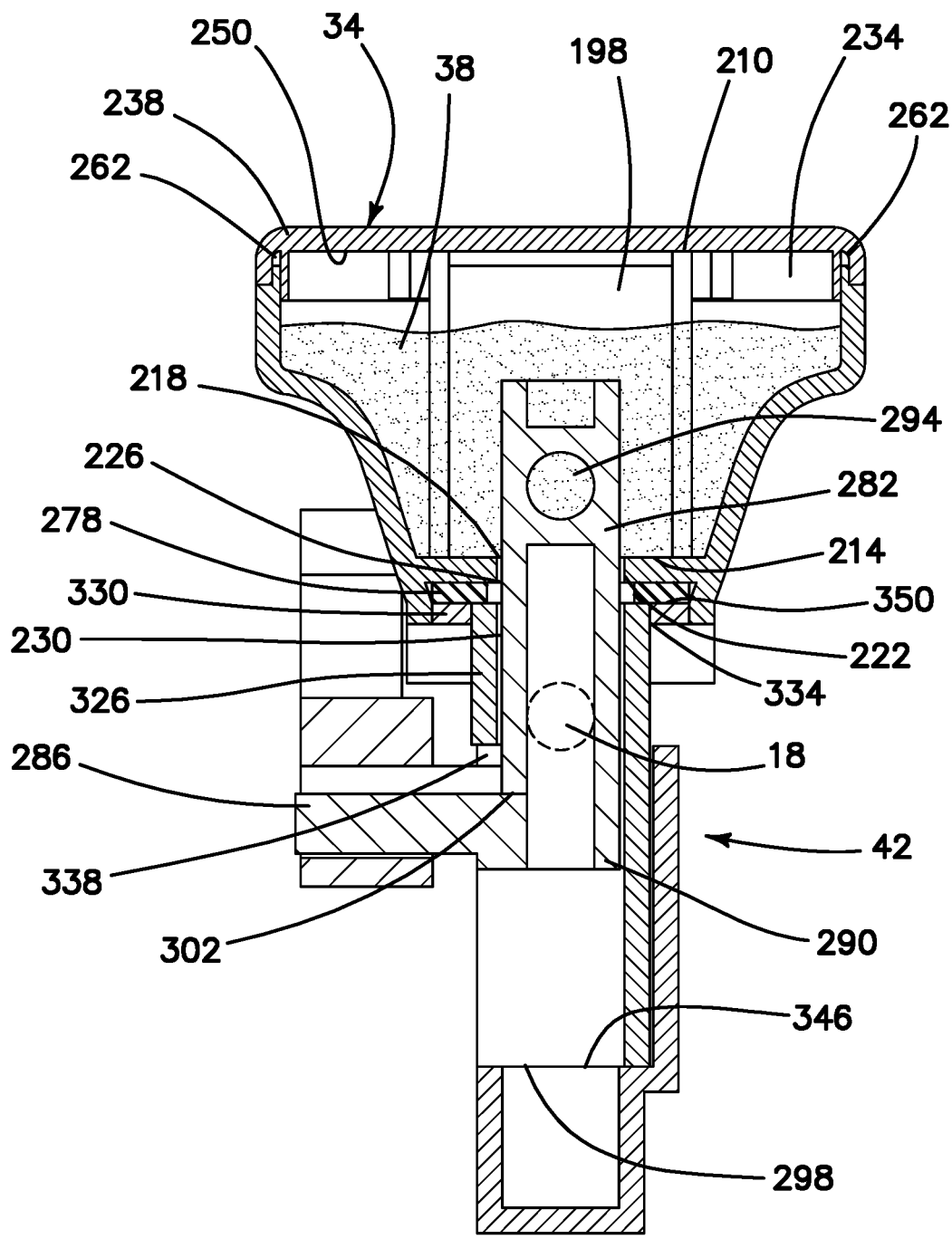
FIG. 10 is an orthogonal cross-sectional detailed view of the projectile storage magazine and projectile loading mechanism in the projectile loading position.

(4) In still another variant, as illustrated in FIGS. 4-6 the compressed gas release mechanism 30 further comprises a trigger 122. The trigger 122 is rotatably mounted to the stock 58 and is urged in a counter-clockwise direction 126 by a trigger return spring 130. The trigger return spring 130 is constrained by a first channel 132 in the stock 58. The trigger 130 has an upper protrusion 134. The upper protrusion 134 engages an internal safety pivot 138. The safety pivot 138 prevents release of the latching mechanism 106 unless operation of the cocking mechanism 50 is completed. The trigger 122 has an elevating ramp 142 located rearwardly of the upper protrusion 134. The elevating ramp 142 urges a releasing bracket 146 of the latching mechanism 106 upwardly against a downwardly urging second compression spring 150 as the trigger 122 is pivoted in a clockwise direction 154.

The releasing bracket 146 is pivotally mounted to the stock 58 and has an upward pointing travel limiting arm 158 located within a notch 162 in the stock 58. The releasing bracket 146 has a downwardly facing rib 166. The rib 166 releasably engages an upwardly facing control notch 170 in the main pole 54. The main pole 54 is attached to the piston 94, has an upwardly angled ramp 174 at a rear end 178 located behind the control notch 170. The ramp 174 guides the rib 166 into the control notch 170. The main pole 54 moves rearwardly in a second channel 182 in the stock 58 during operation of the cocking mechanism 50. The releasing bracket 146 retains the main pole 54 in a first, cocked position 186 as the rib 166 engages the control notch 170. The releasing bracket 146 releases the main pole 54 to a second, fired position 190 as the trigger 122 is pivoted in a clockwise direction 154 elevating the releasing bracket 146 and raising the rib 166 from the control notch 170, allowing the main pole 54 and the piston 94 to move forward as urged by the first compression spring 98, pressurizing the cylinder 82.

(5) In yet another variant, as illustrated in FIGS. 7-10, the projectile storage magazine 34 comprises a cylindrical chamber 198. The cylindrical chamber 198 has first side 202 and second side 206 projectile loading slots. The loading slots 202, 206 extend from an upper edge 210 of the cylindrical chamber 198 to a base 214 of the cylindrical chamber 198. The cylindrical chamber 198 has a circular opening 218 at a lower end 222. The lower end 222 is fitted sealably to an upper end 226 of a vertically oriented circular opening 230 through the chamber 18. A rectangular projectile feeding tray 234 is provided. The feeding tray 234 surrounds the cylindrical chamber 198 and provides additional space for particulate projectiles 38 outside of the cylindrical chamber 198.

A hingedly attached sealing lid 238 is provided. The sealing lid 238 has first 242 and second 246 semi-circular ridges on an underside 250 of the lid 238. The ridges 242, 246 are designed to surround upper edges 254, 258 of the cylindrical chamber 198 adjacent the first 202 side and second 206 side projectile loading slots. The sealing lid 238 has a peripheral channel 262 on the underside 250. The peripheral channel 262 is sized, shaped and located to seal the rectangular projectile feeding tray 234 when the sealing lid 238 is moved to a closed position 266. A lid latching mechanism 270 is provided. The lid latching mechanism 270 is located opposite a hinge 274 for the sealing lid 238.

(6) In a further variant, the lower end 222 of the cylindrical chamber 198 is fitted sealably to the upper end 226 of the vertically oriented circular opening 230 through the chamber 18 with a sealing washer 278.

(7) In still a further variant, the projectile loading mechanism 42 comprises a metering rod 282. The metering rod 282 is sized and shaped to fit sealably through the vertically oriented circular opening 230 through the chamber 18 and has an orthogonal activation bar 286 that extends from a lower end 290 of the metering rod 282 and a through hole 294 located above the activation bar 286. The through hole 294 is orthogonal to the bar 286 and the metering rod 282 and sized and located to align with the chamber 18 when the bar 286 is positioned against a stopping surface 298. The activation bar 286 is urged upwardly to rest against a lower end 302 of the vertically oriented circular opening 230 in the chamber 18 by an anterior end 306 of the pivotally mounted subordination pole 46.

As illustrated in FIGS. 2, 2A, 2B, 2C, 3 and 3, a posterior end 310 of the subordination pole 46 is urged downwardly by an orthogonally mounted cylindrical pin 314 located adjacent the posterior end 310. The pin 314 is pushed downwardly as it travels in a track 318 in a cam plate 322, the cam plate 322 is affixed to the main pole 54 and moves rearwardly as the main pole 54 moves rearwardly during operation of the cocking mechanism 50. The through hole 294 fills with the particulate projectiles 38 when located above the chamber 18 in the cylindrical chamber 198 during operation of the cocking mechanism 50. The activation bar 286 is urged downwardly by the pivotally mounted subordination pole 46 to rest against the stopping surface 298 during activation of the compressed gas release mechanism 30.

(8) In yet a further variation, as illustrated in FIGS. 2, 2a, 3, 3a, 9 and 10, the projectile loading mechanism 42 further comprises a mid-chamber pipe 326. The pipe 326 extends downwardly from the lower end 222 of the cylindrical chamber 198. A trajectory guide 330 is provided. The guide 330 is located below the cylindrical chamber 198, has a hollow bore 334 sized to fit slidably about the pipe 326 and has a vertical slot 338 extending downwardly from the lower end 222 for a first predetermined distance 342 and terminates in a stopping surface 346. The trajectory guide 330 is located about the pipe 326 and provides a support platform 350 for attachment of the projectile storage magazine 34. The metering rod 282 is cylindrical in shape and is sized to fit slidably within the pipe 326. The metering rod 282 has the orthogonal activation bar 286 which extends from the lower end 290 thereof and the through hole 294 located above the activation bar 286. The through hole 294 is orthogonal to the activation bar 286 and the metering rod 282 and sized and located to align with the chamber 18 when the bar 286 is positioned against the stopping surface 298. The subordination pole 46 is pivotally mounted to a cover 354 of the compressed gas source 14. The anterior end 306 of the subordination pole 46 includes a metering slot 358.

The metering slot 358 surrounds the activation bar 286. The posterior end 310 of the subordination pole 46 is urged downwardly by the cylindrical pin 314 and cam plate 322 to move the metering rod 282 upwardly into the projectile storage magazine 34 during operation of the cocking mechanism 50. The particulate projectiles 38 fill the through hole 294 of the metering rod 282 as it moves in the projectile storage magazine 34 surrounded by the particulate projectiles 38. The posterior end 310 of the subordination pole 46 is urged upwardly by the cylindrical pin 314 and the cam plate 322 during activation of the compressed gas release mechanism 30, the metering slot 358 moves the activation bar 286 downwardly, aligning the through hole 294 with the chamber 18 permitting the compressed gas source 14 to drive the particulate projectiles 38 out of the chamber 18 and through the barrel 22.

Figure 11:
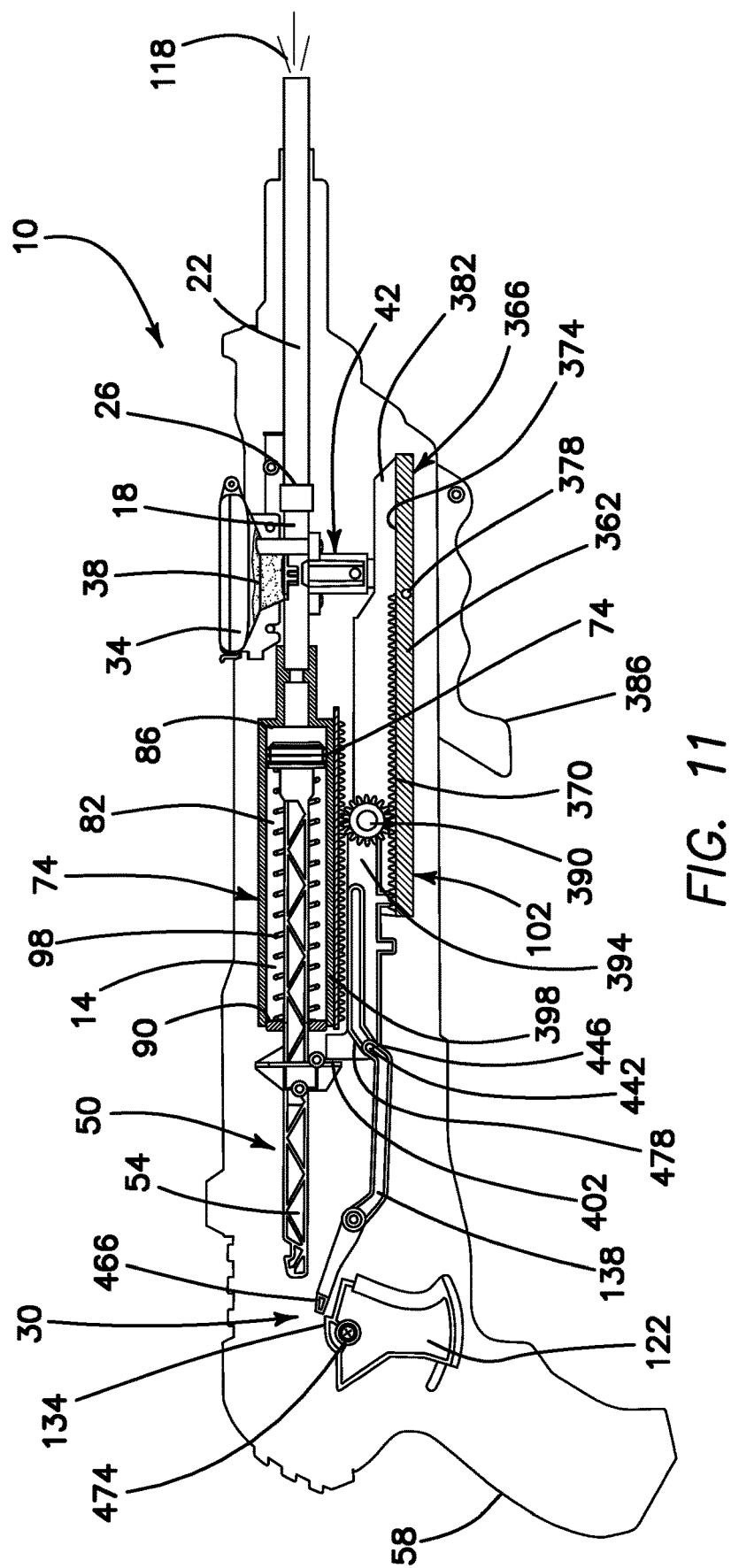
FIG. 11 is a side cross-sectional view of the FIG. 1 embodiment illustrating the spring-activated compressed gas chamber as the bug gun in fired position.
Figure 12:
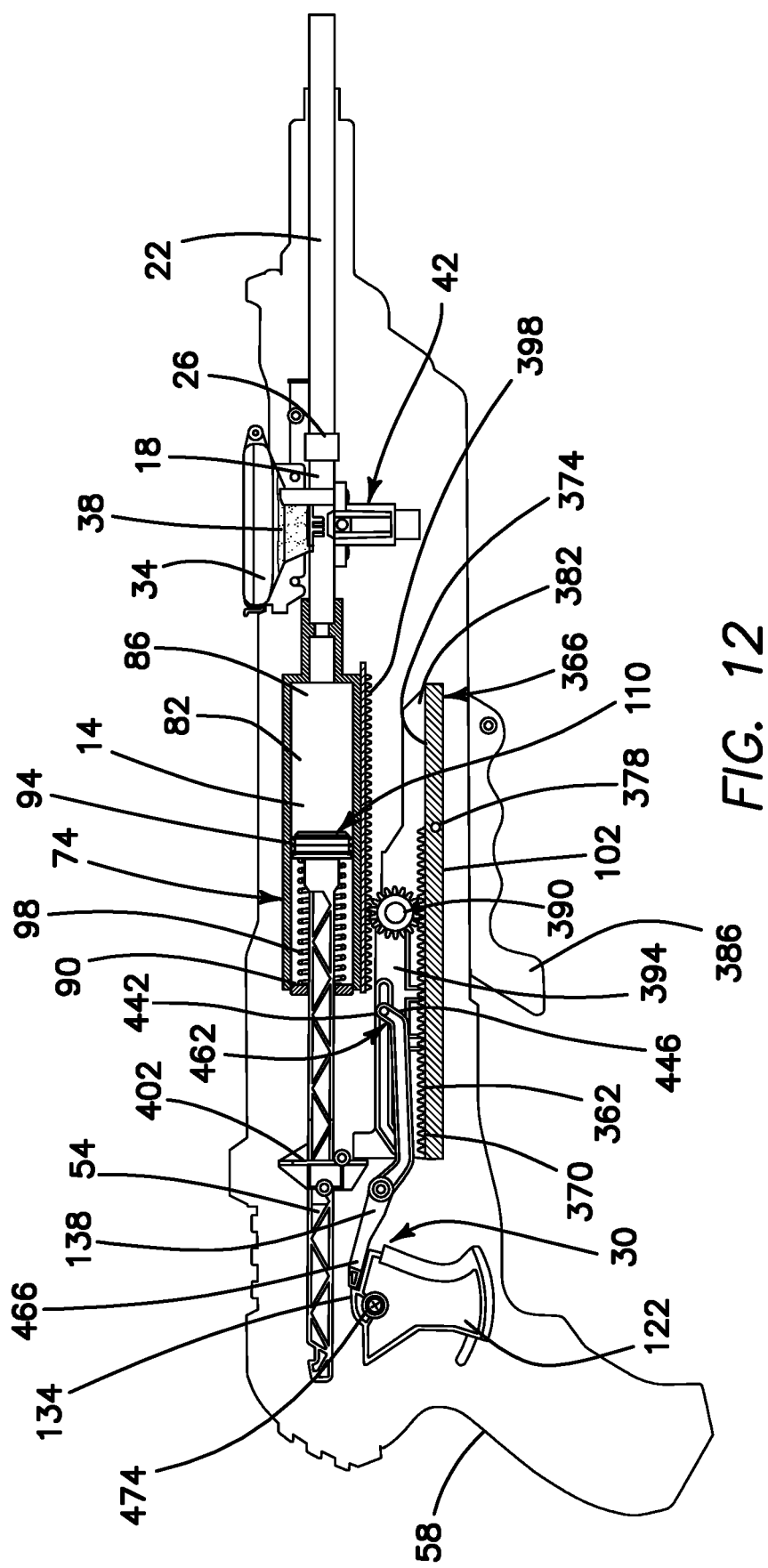
FIG. 12 is a side cross-sectional view of the FIG. 1 embodiment illustrating the spring-activated compressed gas chamber with the bug gun in cocked position.
Figure 13:
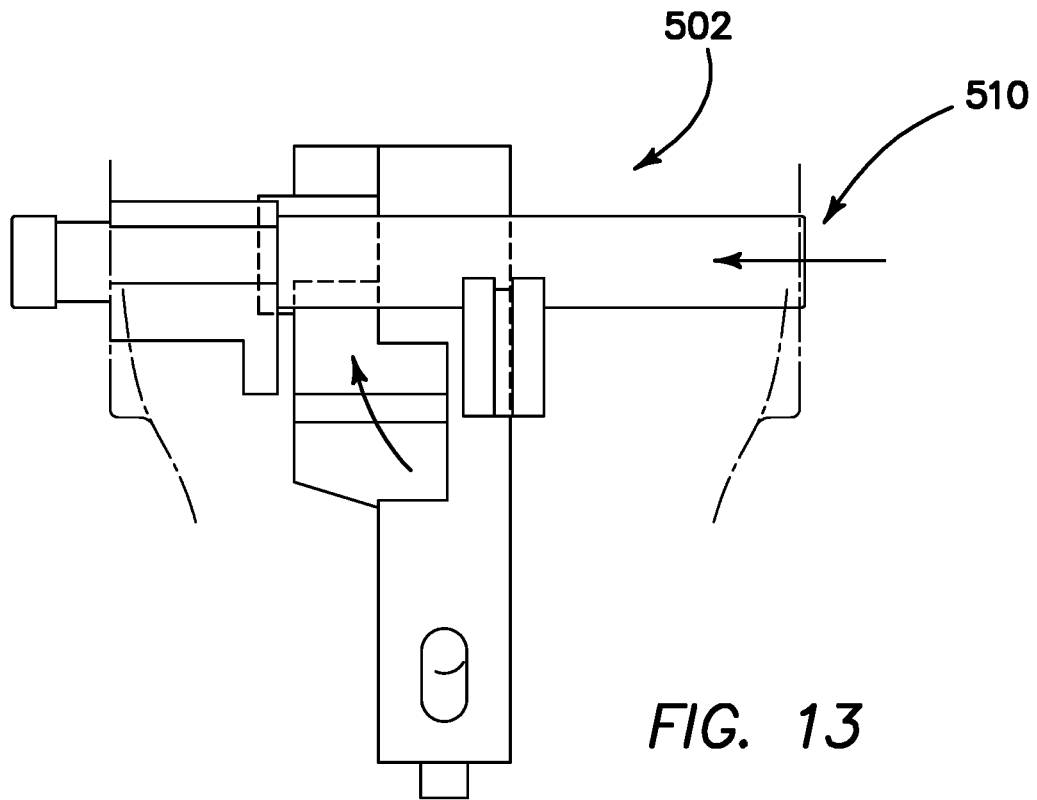
FIG. 13 is a[n] rear elevational illustration of the manual safety components of the FIG. 1 embodiment in fire position illustrating the unblocking of movement of the trigger prior to firing.
Figure 14:
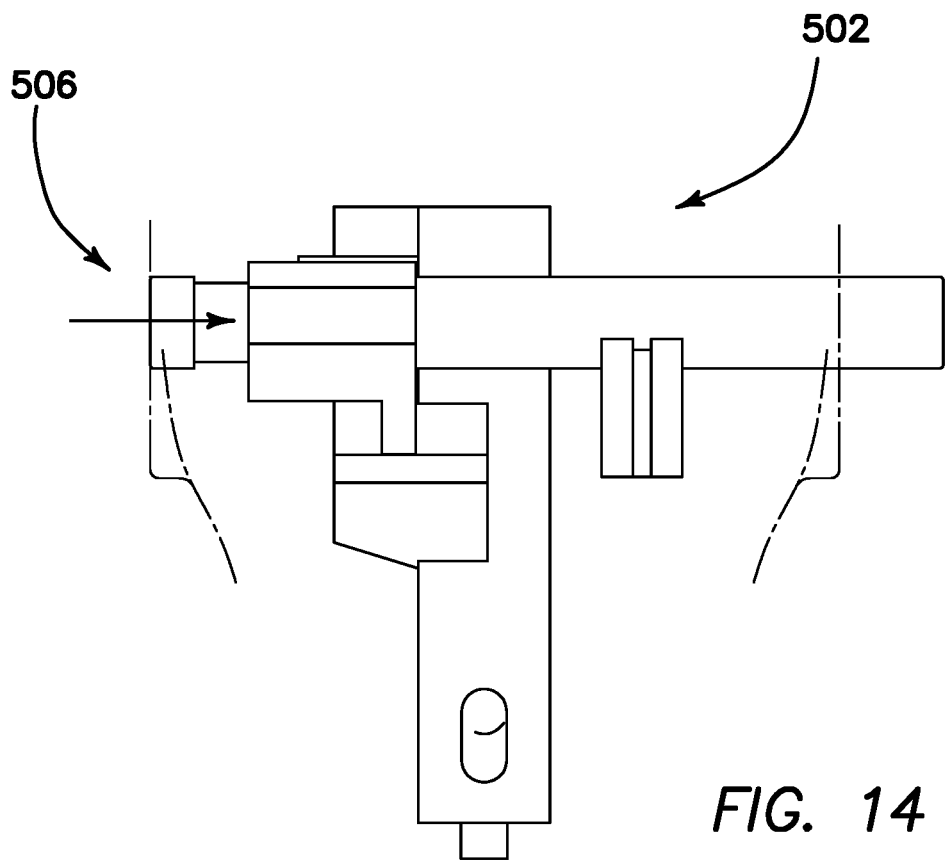
FIG. 14 is a rear elevational illustration of the manual safety components of the FIG. 1 embodiment in safe position illustrating the blocking of movement of the trigger.
Figure 13A:
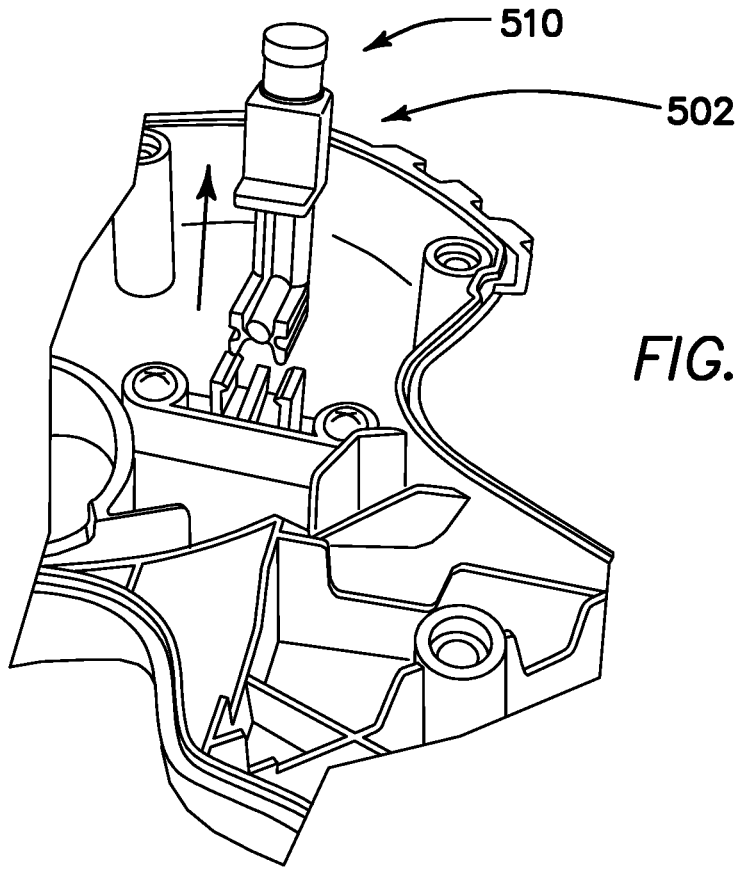
FIG. 13A is partial perspective view of the manual safety components of the FIG. 1 embodiment in fire position illustrating the unblocking of movement of the trigger prior to firing.
Figure 14A:
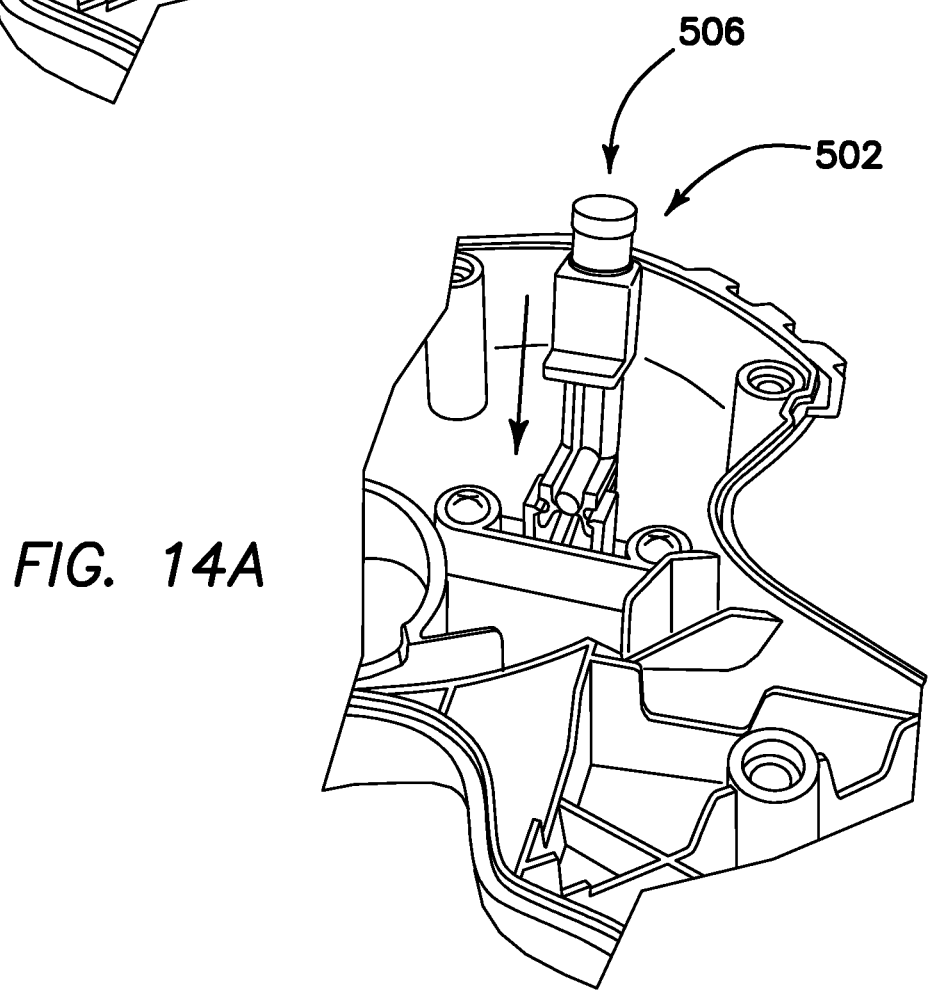
FIG. 14A is partial perspective view of the manual safety components of the FIG. 1 embodiment in safe position illustrating the blocking of movement of the trigger; is an illustration of the manual safety components of the FIG. 1 embodiment in safe position illustrating the blocking of movement of the trigger.

(9) In another variant of the invention, as illustrated in FIGS. 11 and 12, the spring compression mechanism 102 further comprises a primary gear rack 362. The gear rack 362 is slidably located in a gear rack channel 366 in the stock 58, has gear teeth 370 located upon an upper surface 374 and has mounting fixtures 378 adjacent a forward end 382 for attachment of a slide handle 386. A drive gear 390 is provided. The drive gear 390 is rotatably mounted to a cocking sled 394. The cocking sled 394 moves slidably within the primary gear rack 362. A secondary gear rack 398 is provided. The secondary gear rack 398 is attached below the piston 94 and is located above the drive gear 390. The primary gear rack 362 engages the drive gear 390 and the drive gear 390 engages the secondary gear rack 398. Rearward movement of the slide handle 386 moves the primary gear rack 362 rearward, rotates the drive gear 390, and moves the cocking sled 394 rearward, bearing against a cocking paddle 402 on the main pole 54 and moving the piston 94 rearward, compressing the first compression spring 98.

(10) In still another variant, as illustrated in FIGS. 3B, 3C, 3D and 3E, a spring-loaded cocking mechanism lock-out block 406 is provided. The lockout block 406 is pivotally mounted to an underside 410 of the cover 354 of the compressed gas source 14 and has a pivoting ramp 414 located on a first side edge 418, a retaining notch 422 located forward of the pivoting ramp 414, a stepped angled cam 426 orthogonally located above the pivoting ramp 414. The pivoting ramp 414 slidably engages a rear surface 430 of a vertical locking tab 434. The locking tab 434 is affixed to a side rail 438 of the cocking mechanism 50. The retaining notch 422 moves to block rearward movement of the locking tab 434 as the notch 422 moves past the tab 434 during forward movement of the cocking mechanism 50, thereby preventing a second activation of the cocking mechanism 50. A cam activating rod 438 is provided. The activating rod 438 is affixed to the subordination pole 46, adjacent the anterior end 306 and rearward of the metering slot 358. The cam activating rod 438 bears on the stepped angled cam 426 during activation of the compressed gas release mechanism 30 and causes the lock-out block 406 to pivot inwardly, causing the retaining notch 422 to disengage from the rear surface 430 of the locking tab 434, thereby permitting activation of the cocking mechanism 50.

(11) In yet another variation, as illustrated in FIGS. 11 and 12, a control pin 442 is provided. The control pin 442 is attached to a first end 446 of an internal safety pivot 454. the control pin moves in a slot 450 in the cocking sled 394. As illustrated in FIG. 12, the control pin 442 maintains the first end 446 of the internal safety pivot 454 in an elevated position 462 during rearward movement of the cocking sled 394, causing a second end 466 of the pivot 454, to engage an upper protrusion 470 at an upper end 474 of the trigger 122, thereby preventing activation of the compressed gas release mechanism 30. As illustrated in FIG. 11, the control pin 442 causes downward movement of the first end 446 of the internal safety pivot 454 to a lowered position 478 upon completion of forward movement of the cocking sled 394. The downward movement permits release of the upper protrusion 470 of the trigger 122 and permits activation of the gas release mechanism 30.

Figure 15:
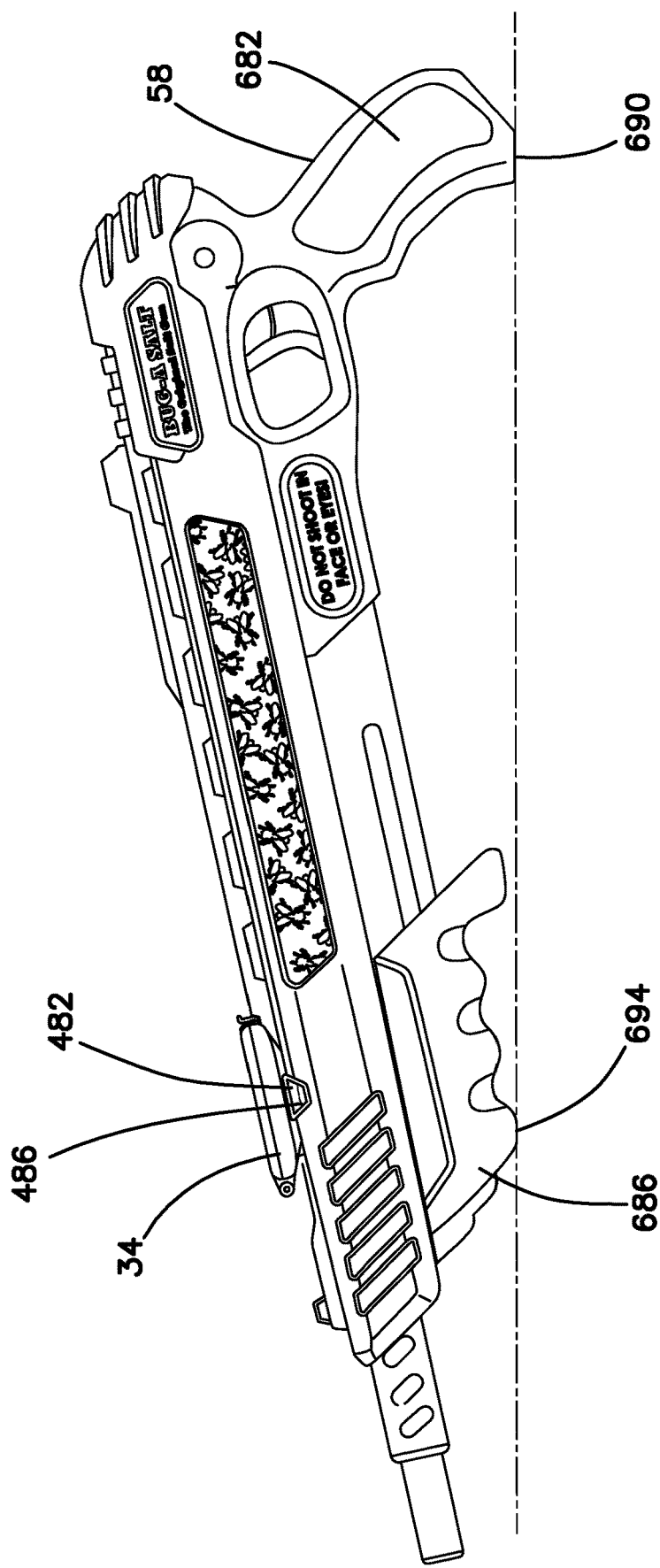
FIG. 15 is a side elevational view of the FIG. 1 embodiment illustrating the flattened lower surfaces of the pistol grip and forearm and the external safety.

(12) In a further variant, as illustrated in FIGS. 1 and 15, the support stock 58 further comprises a sight glass 482. The sight glass 482 is positioned adjacent the magazine 34 and permits a view of a level 486 of the particulate projectiles 38 contained in the magazine 34.

(13) In still a further variant, as illustrated in FIGS. 4-6, an automatic cocking status indicator 490 is provided. The cocking status indicator 490 moves to a raised, visible position 494 after cocking of the gun 10 and moves to a lowered, hidden position 498 after discharge of the gun 10.

(14) In yet a further variant, as illustrated in FIGS. 13, 13A, 14 and 14A, an external, manual safety mechanism 502 is provided. The manual safety mechanism 502 is movable from a safe position 506 to a firing position 510 by a user 114 while maintaining a grip on the gun 10.

Figure 19:
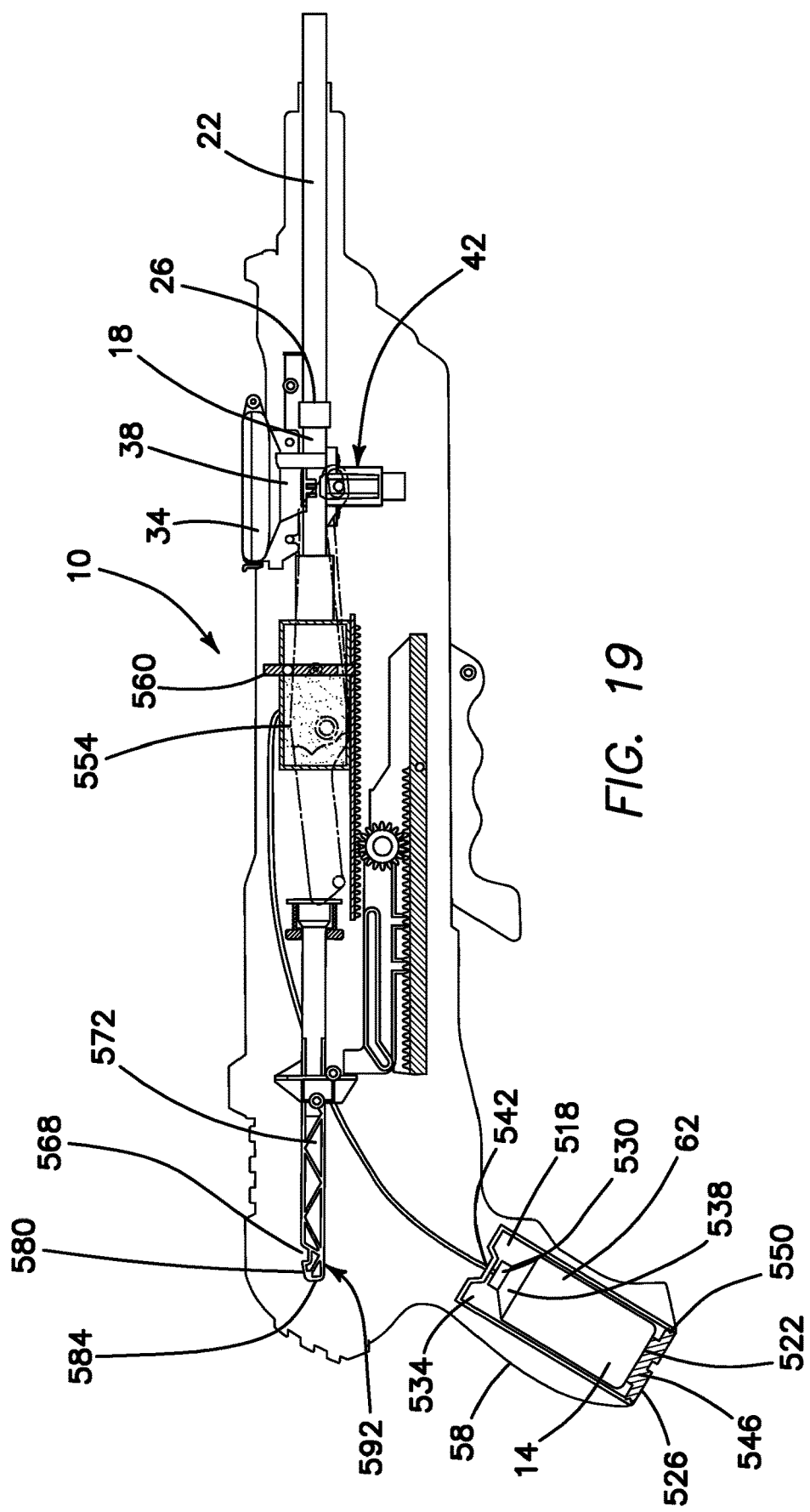
FIG. 19 is a side cross-sectional view of a $CO_2$ powered embodiment of the bug gun illustrating the metering device and latching mechanism in the cocked position.
Figure 20:
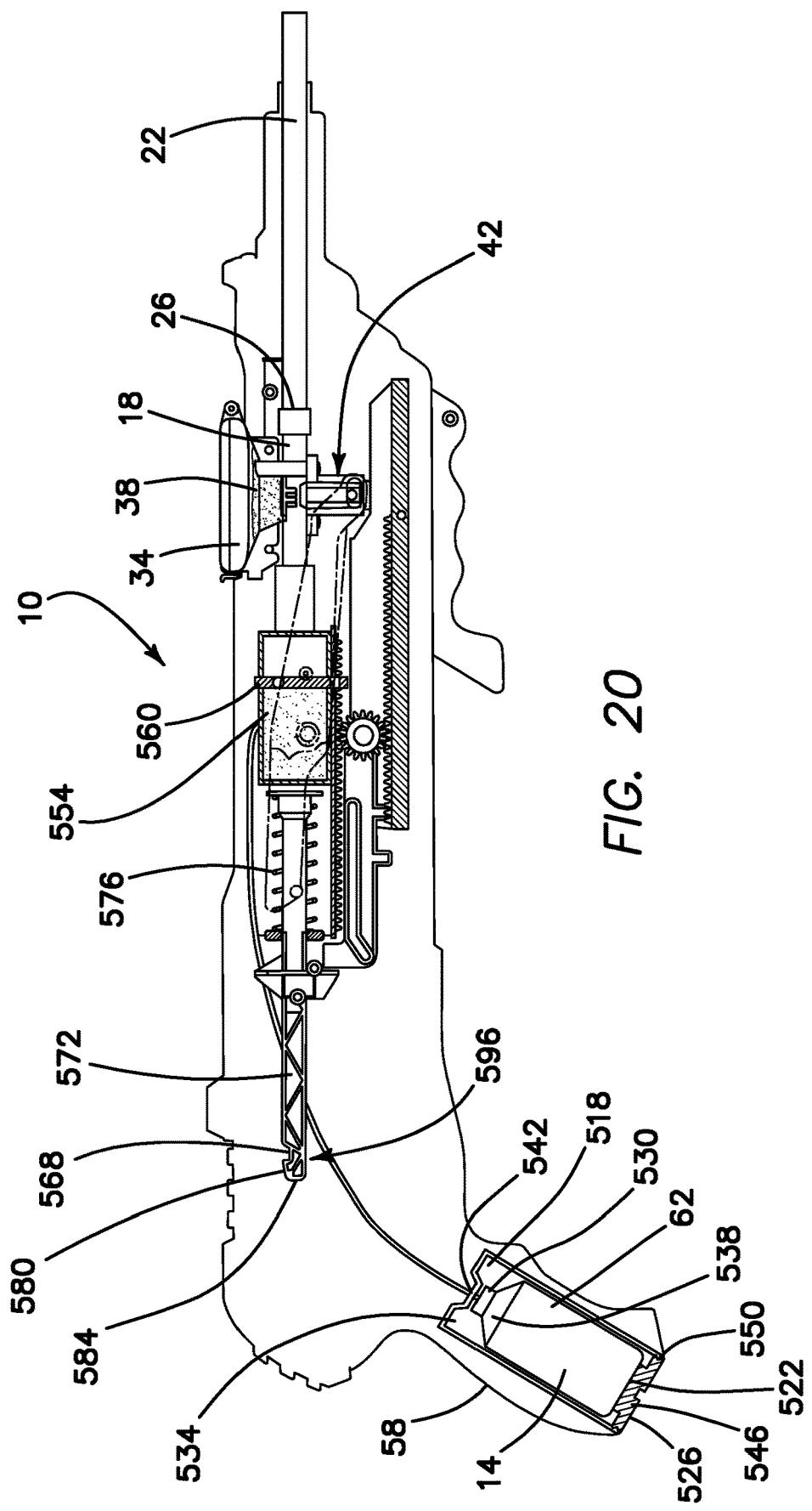
FIG. 20 is a side cross-sectional view of a $CO_2$ powered embodiment of the bug gun illustrating the metering device and latching mechanism in the fired position.

(15) In another variant of the invention, as illustrated in FIGS. 19 and 20, the gun 10 uses a prefilled $CO_2$ cartridge 62 as a compressed gas source 14, the gun 10 further comprises a cylindrical cartridge chamber 518. The cartridge chamber 518 is sized and shaped to enclose the $CO_2$ cartridge 62, has a sealable opening 522 at a first end 526 for introduction of the cartridge 62 and a concave seat 530 located at a second end 534. The seat 530 is sized and shaped to fit sealably about a discharging end 538 of the cartridge 62. A hollow puncturing needle 542 is located within the seat 530. A sealing cap 546 is provided. The cap 546 is removably attached to the cartridge chamber 518 by mating screw threads 550. Tightening of the cap 546 urges the cartridge 62 against the puncturing needle 542.

A pressure vessel 554 is provided. The pressure vessel 554 is fluidly connected to a metering device 560. The metering device 560 permits a predetermined charge of compressed gas 564 to enter the chamber 18 upon activation of the compressed gas release mechanism 30.

(16) In still another variant, as illustrated in FIGS. 4-6, 19 and 20, the compressed gas release mechanism 30 further comprises a trigger 122. The trigger 122 is rotatably mounted to the stock 58 and urged in a counter-clockwise direction 126 by a trigger return spring 130. The trigger return spring 130 is constrained by a first channel 134 in the stock 58. The trigger 130 has an upper protrusion 134. The upper protrusion 134 engages an internal safety pivot 138.

The safety pivot 138 prevents release of the latching mechanism 106 unless operation of the cocking mechanism 50 is completed.

The trigger has an elevating ramp 142 located rewardly of the upper protrusion 134. The elevating ramp 142 urges a releasing bracket 146 of the latching mechanism 106 upwardly against a downwardly urging second compression spring 150 as the trigger 122 is pivoted in a clockwise direction 154.

The releasing bracket 146 is pivotally mounted to the stock 58 and has an upward pointing travel limiting arm 158 located within a notch 162 in the stock 58. The releasing bracket 146 and has a downwardly facing rib 166. The rib 166 releasably engages an upwardly facing control notch 568 in a loading rod 572. The loading rod 572 is urged forward by a loading coil spring 576. The loading rod 572 has an upwardly angled ramp 580 at a rear end 584, located behind the control notch 568. The ramp 580 guides the rib 166 into the control notch 568. The loading rod 572 moves rearwardly in a loading rod channel (not shown) in the stock 58 during operation of the cocking mechanism 50. The releasing bracket 146 retains the loading rod 572 in a first, cocked position 592 as the rib 166 engages the control notch 568 and releases the loading rod 572 to a second, fired position 596 as the trigger 122 is pivoted in a clockwise direction 194 elevating the releasing bracket 146 and raising the rib 166 from the control notch 568, allowing the loading rod 572 to move forward as urged by the loading coil spring 576, activating the projectile loading mechanism 42 and the metering device 560.

Figure 21:
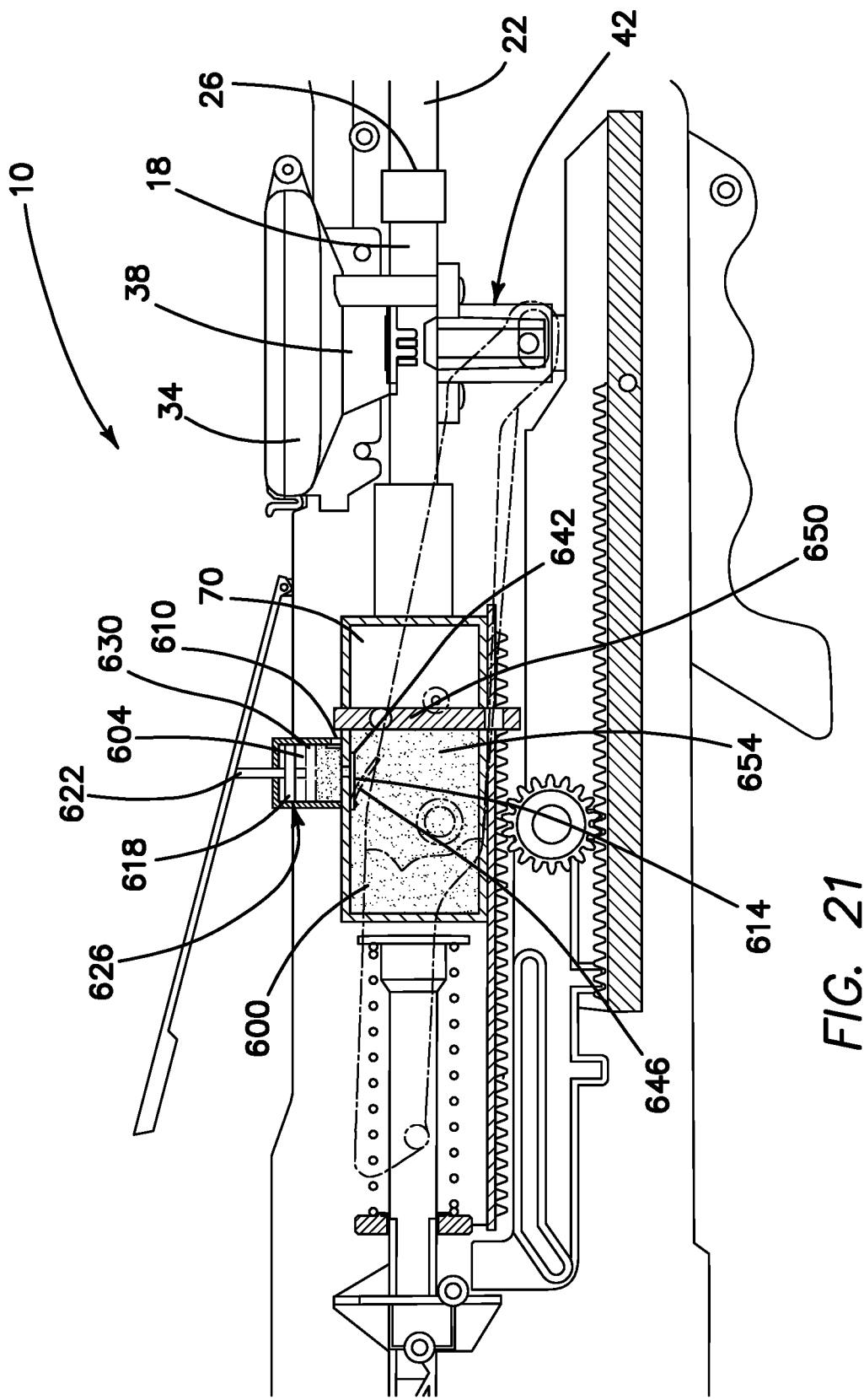
FIG. 21 is a side cross-sectional view of a pneumatically pump powered embodiment of the bug gun illustrating the pumping mechanism and valving connecting to the metering device.

(17) In yet another variant, as illustrated in FIG. 21, the gun 10 uses a pneumatically pumped air reservoir 600 as a compressed gas source 14, the gun 10 further comprises a gas cylinder 604. The cylinder 604 has an inlet valve 610 and an outlet valve 614. A piston 618 is provided. The piston 618 fits sealably within the cylinder 604. A pumping mechanism 622 is provided. The pumping mechanism 622 is mechanically linked to the piston 618. The pumping mechanism 622 moves the piston 618 from an extended position 626 to a compressed position 630 within the cylinder 604. The inlet valve 610 is in an open position (not shown) as the piston 618 moves from the compressed position 630 to the extended position 626 and is in a closed position (not shown) as the piston 618 moves from the extended position 626 to the compressed position 630. The outlet valve 614 is in a closed position 642 as the piston 618 moves from the compressed position 630 to the extended position 626 and is in an open position 646 as the piston 618 moves from the extended position 626 to the compressed position 630. The air reservoir 600 is fluidly connected to the outlet valve 614, the chamber 18 and a metering device 650. The metering device 650 permits a predetermined charge of compressed gas 654 to enter the chamber 18 upon activation of the compressed gas release mechanism 30. Repeated movement of the piston 618 by the pumping mechanism 622 from the extended position 626 to the compressed position 630 within the cylinder 604 will increase pressure within the air reservoir 600, permitting the particulate projectiles 38 to be ejected from the chamber 18 with increased force upon release of the pressure by the compressed gas release mechanism 30.

(18) In a further variant, as illustrated in FIGS. 4-6 and 19-21, the compressed gas release mechanism 30 further comprises a trigger 122. The trigger 122 is rotatably mounted to the stock 58 and urged in a counter-clockwise direction 126 by a trigger return spring 130. The trigger return spring 130 is constrained by a first channel 134 in the stock 58. The trigger 130 has an upper protrusion 134. The upper protrusion 134 engages an internal safety pivot 138. The safety pivot 138 prevents release of the latching mechanism 106 unless operation of the cocking mechanism 50 is completed.

The trigger has an elevating ramp 142 located rewardly of the upper protrusion 134. The elevating ramp 142 urges a releasing bracket 146 of the latching mechanism 106 upwardly against a downwardly urging second compression spring 150 as the trigger 122 is pivoted in a clockwise direction 154.

The releasing bracket 146 is pivotally on a fitting mounted to the stock 58 and has an upward pointing travel limiting arm 158 located within a notch 162 in the stock 58. The releasing bracket 146 and has a downwardly facing rib 166. The rib 166 releasably engages an upwardly facing control notch 568 in a loading rod 572. The loading rod 572 is urged forward by a loading coil spring 576. The loading rod 572 has an upwardly angled ramp 580 at a rear end 584, located behind the control notch 568. The ramp 580 guides the rib 166 into the control notch 568. The loading rod 572 moves rearwardly in a loading rod channel 588 in the stock 58 during operation of the cocking mechanism 50. The releasing bracket 146 retains the loading rod 572 in a first, cocked position 592 as the rib 166 engages the control notch 568 and releases the loading rod 572 to a second, fired position 596 as the trigger 122 is pivoted in a clockwise direction 194 elevating the releasing bracket 146 and raising the rib 166 from the control notch 568, allowing the loading rod 572 to move forward as urged by the loading coil spring 576, activating the projectile loading mechanism 42 and the metering device 560.

Figure 22:
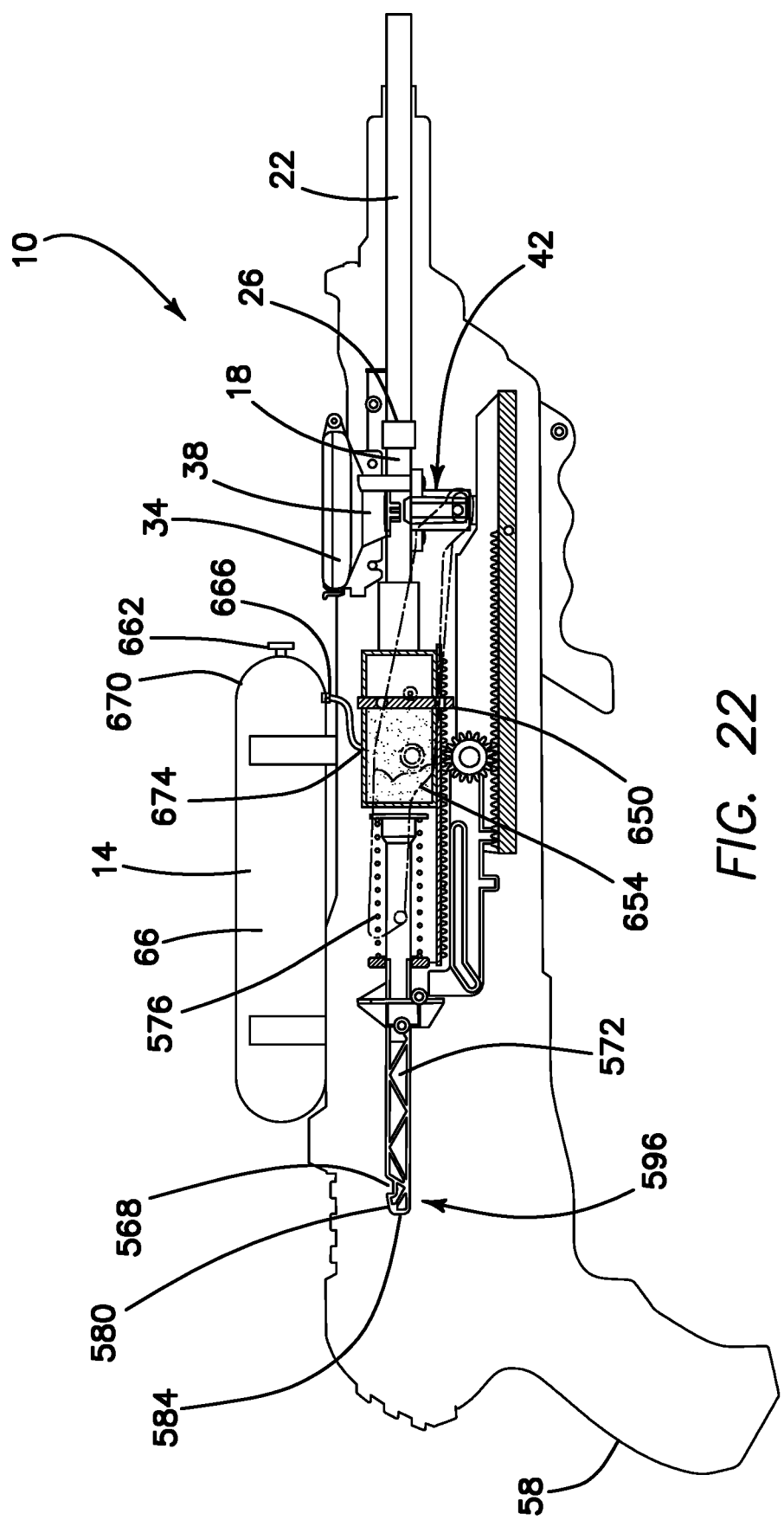
FIG. 22 is a side cross-sectional view of a refillable air cylinder powered embodiment of the bug gun illustrating attachment of the cylinder and connection to the metering device.

(19) In still a further variant, as illustrated in FIG. 22, the gun 10 uses a refillable compressed gas cylinder 66 as a compressed gas source 14. The cylinder 66 has a shut off valve 662 and an attachment fitting 666 located adjacent a first end 670. A mating attachment fitting 674 is provided. The mating fitting 674 is mounted to the stock 58 and is fluidly connected to a metering device 650. The metering device 650 is fluidly connected to the chamber 18 and the metering device 650 permits a predetermined charge of compressed gas 654 to enter the chamber 18 upon activation of the compressed gas release mechanism 30. When a charged refillable compressed gas cylinder 658 is attached to the mating attachment fitting 674 the shut off valve 662 is opened and the compressed gas 654 is released by the metering device 650 upon activation of the compressed gas release mechanism 30.

(20) In yet a further variant, as illustrated in FIGS. 4-6, 19 and 22, the compressed gas release mechanism 30 further comprises a trigger 122. The trigger 122 is rotatably mounted to the stock 58 and urged in a counter-clockwise direction 126 by a trigger return spring 130. The trigger return spring 130 is constrained by a first channel 134 in the stock 58. The trigger 130 has an upper protrusion 134. The upper protrusion 134 engages an internal safety pivot 138. The safety pivot 138 prevents release of the latching mechanism 106 unless operation of the cocking mechanism 50 is completed.

The trigger has an elevating ramp 142 located rewardly of the upper protrusion 134. The elevating ramp 142 urges a releasing bracket 146 of the latching mechanism 106 upwardly against a downwardly urging second compression spring 150 as the trigger 122 is pivoted in a clockwise direction 154.

The releasing bracket 146 is pivotally mounted to the stock 58 and has an upward pointing travel limiting arm 158 located within a notch 162 in the stock 58. The releasing bracket 146 and has a downwardly facing rib 166. The rib 166 releasably engages an upwardly facing control notch 568 in a loading rod 572. The loading rod 572 is urged forward by a loading coil spring 576. The loading rod 572 has an upwardly angled ramp 580 at a rear end 584, located behind the control notch 568. The ramp 580 guides the rib 166 into the control notch 568. The loading rod 572 moves rearwardly in a loading rod channel 588 in the stock 58 during operation of the cocking mechanism 50. The releasing bracket 146 retains the loading rod 572 in a first, cocked position 592 as the rib 166 engages the control notch 568 and releases the loading rod 572 to a second, fired position 596 as the trigger 122 is pivoted in a clockwise direction 194 elevating the releasing bracket 146 and raising the rib 166 from the control notch 568, allowing the loading rod 572 to move forward as urged by the loading coil spring 576, activating the projectile loading mechanism 42 and the metering device 560.

Figure 23:
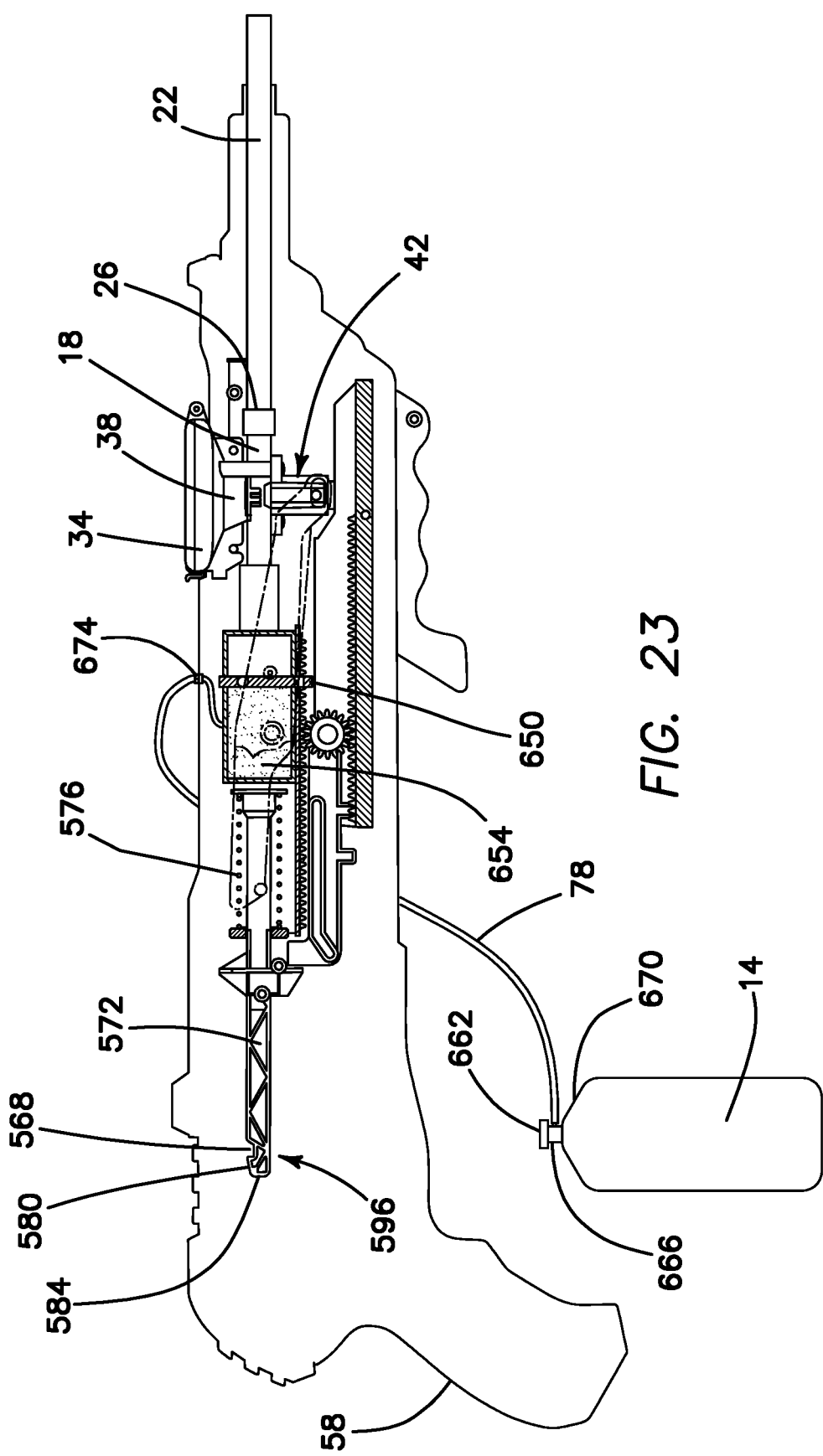
FIG. 23 is a side cross-sectional view of an external compressed gas line powered embodiment of the bug gun illustrating attachment of the gas line and connection to the metering device.

(21) In another variant of the invention, as illustrated in FIG. 23, the gun 10 uses an external compressed gas line 78 as a compressed gas source 14, The compressed gas line 678 is connected to a compressed gas source 14 and has a shut off valve 662 and an attachment fitting 666 located adjacent a first end 670. A mating attachment fitting 674 is provided. The mating fitting 674 is mounted to the support stock 58 and is fluidly connected to a metering device 650. The metering device 650 is fluidly connected to the chamber 18 and the metering device 650 permits a predetermined charge of compressed gas 654 to enter the chamber 18 upon activation of the compressed gas release mechanism 30. When the external compressed gas line 78 is attached to the mating attachment fitting 674, the shut off valve 662 is opened and the compressed gas 654 is released by the metering device 650 upon activation of the compressed gas release mechanism 30.

(22) In still another variant, as illustrated in FIGS. 4-6 and 19-23, the compressed gas release mechanism 30 further comprises a trigger 122. The trigger 122 is rotatably mounted to the stock 58 and urged in a counter-clockwise direction 126 by a trigger return spring 130. The trigger return spring 130 is constrained by a first channel 134 in the stock 58. The trigger 130 has an upper protrusion 134. The upper protrusion 134 engages an internal safety pivot 138. The safety pivot 138 prevents release of the latching mechanism 106 unless operation of the cocking mechanism 50 is completed.

The trigger has an elevating ramp 142 located rewardly of the upper protrusion 134. The elevating ramp 142 urges a releasing bracket 146 of the latching mechanism 106 upwardly against a downwardly urging second compression spring 150 as the trigger 122 is pivoted in a clockwise direction 154.

The releasing bracket 146 is pivotally mounted to the stock 58 and has an upward pointing travel limiting arm 158 located within a notch 162 in the stock 58. The releasing bracket 146 and has a downwardly facing rib 166. The rib 166 releasably engages an upwardly facing control notch 568 in a loading rod 572. The loading rod 572 is urged forward by a loading coil spring 576. The loading rod 572 has an upwardly angled ramp 580 at a rear end 584, located behind the control notch 568. The ramp 580 guides the rib 166 into the control notch 568. The loading rod 572 moves rearwardly in a loading rod channel 588 in the stock 58 during operation of the cocking mechanism 50. The releasing bracket 146 retains the loading rod 572 in a first, cocked position 592 as the rib 166 engages the control notch 568 and releases the loading rod 572 to a second, fired position 596 as the trigger 122 is pivoted in a clockwise direction 194 elevating the releasing bracket 146 and raising the rib 166 from the control notch 568, allowing the loading rod 572 to move forward as urged by the loading coil spring 576, activating the projectile loading mechanism 42 and the metering device 650.

(23) In yet another variant, as illustrated in FIG. 15, a pistol grip 682 and a forearm 686 of the stock 58 have flattened lower surfaces 690, 694. The flattened surfaces 690, 694 permit the bug killing gun 10 to be balanced in an upright position for adding the particulate projectiles 38 to the projectile storage magazine 34.

Figure 16:
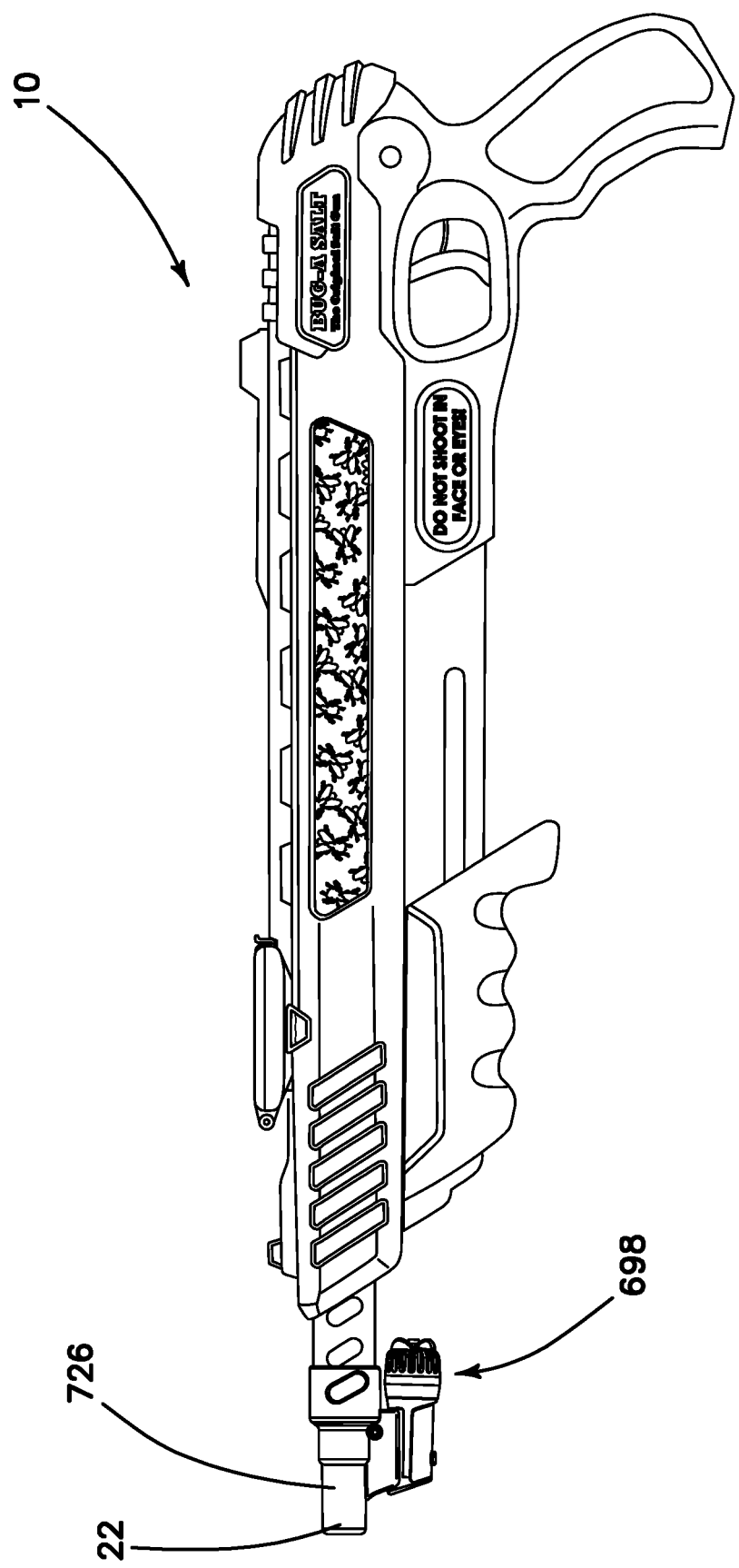
FIG. 16 is a side elevational view of the FIG. 1 embodiment with mounted laser sighting device.

(24) In a further variant, as illustrated in FIGS. 16-18, a laser sighting device 698 is provided. The laser sighting device 698 comprises a battery powered laser 702. The laser 702 is capable of producing a laser aiming spot 706. A housing 710 is provided. The housing 710 is adapted to contain the laser 702, a battery power source 714 and a control circuit 718 for the laser 702. An attachment mechanism 722 is provided. The attachment mechanism 722 is adapted to attach the laser sighting device 698 adjacent a distal end 726 of the barrel 22.

(25) In still a further variant, the attachment mechanism 722 is integrally formed with the distal end 726 of the barrel 22.

(26) In yet a further variant, the attachment mechanism 722 is adapted to removably attach the laser sighting device 698 to the distal end 726 of the barrel 22.

(27) In another variant of the invention, the laser sighting device 698 further comprises elevation 730 and windage 734 adjustments for an aiming point 738 of the laser aiming spot 706.

(28) In still another variant, a power switch 742 is provided. The switch 742 controls power to the laser 702.

(29) In yet another variant, the power switch 742 is mounted on the housing 710.

(30) In a final variant, the power switch 742 is integral with the trigger 122, wherein initial rearward movement of the trigger 122 completes a circuit 746 within the power switch 742, thereby providing the laser aiming spot 706 prior to activation of the compressed gas release mechanism 30.

The bug killing gun 10 has been described with reference to particular embodiments. Other modifications and enhancements can be made without departing from the spirit and scope of the claims that follow.

The invention claimed is:

1. An improved loading mechanism bug killing gun, comprising:
   a compressed gas source,
   a chamber, said chamber fluidly connected to said compressed gas source;
   a barrel, said barrel disposed at a distal end of said chamber;
   a compressed gas release mechanism, said release mechanism connected to said compressed gas source;
   a projectile storage magazine, said magazine storing particulate projectiles and being disposed adjacent said chamber;
   said magazine comprising:
      a cylindrical chamber, said cylindrical chamber having first side and second side projectile loading slots, said loading slots extending from an upper edge of said cylindrical chamber to a base of said cylindrical chamber, said cylindrical chamber having a circular opening at a lower end;
      said lower end fitted sealably to an upper end of a vertically oriented circular opening through said chamber;
      a rectangular projectile feeding tray, said feeding tray surrounding said cylindrical chamber and providing additional space for particulate projectiles outside of said cylindrical chamber;
      a hingedly attached sealing lid, said sealing lid having first and second semi-circular ridges on an underside of said lid, said ridges designed to surround upper edges of said cylindrical chamber adjacent said first side and second side projectile loading slots;
      said sealing lid having a peripheral channel on said underside, said peripheral channel being sized, shaped and disposed to seal said rectangular projectile feeding tray when said sealing lid is moved to a closed position; and
      a lid latching mechanism, said lid latching mechanism disposed opposite a hinge for said sealing lid;
   a projectile loading mechanism, said loading mechanism moving said particulate projectiles into said chamber from said magazine using a bi-directional cam-operated pivotally mounted subordination pole;
   a cocking mechanism having a main pole and mechanically connecting said compressed gas source, said compressed gas release mechanism, and said projectile loading mechanism;
   said projectile loading mechanism comprising:
      a metering rod, said metering rod being sized and shaped to fit sealably through said vertically oriented circular opening through said chamber and having an orthogonal activation bar extending from a lower end thereof and a through hole disposed above said activation bar, said through hole being orthogonal to said bar and said metering rod and sized and disposed to align with said chamber when said bar is positioned against a stopping surface;
      said activation bar being urged upwardly to rest against a lower end of said vertically oriented circular opening in said chamber by an anterior end of said pivotally mounted subordination pole, a posterior end of said subordination pole being urged downwardly by an orthogonally mounted cylindrical pin disposed adjacent said posterior end, said pin being pushed downwardly as said pin travels in a track in a cam plate, said cam plate being affixed to said main pole and moving rearwardly as said main pole moves rearwardly during operation of said cocking mechanism;
      said through hole filling with said particulate projectiles when disposed above said chamber in said cylindrical chamber during operation of said cocking mechanism; and
      said activation bar being urged downwardly by said pivotally mounted subordination pole to rest against said stopping surface during activation of said compressed gas release mechanism;
   a stock, said stock housing and supporting said compressed gas source, said compressed gas release mechanism, said barrel, said chamber, said projectile storage magazine, said cocking mechanism and said projectile loading mechanism;
   wherein, when said gun is cocked with said cocking mechanism, said projectile loading mechanism gathers a predetermined quantity of said particulate projectiles and positions said projectiles in said chamber; and when said compressed gas release mechanism is activated said projectiles are ejected from said chamber into said barrel and expelled from said gun.

2. The bug killing gun, as described in claim 1, wherein said compressed gas source is selected from the group comprising:
a prefilled $CO_2$ cartridge, a refillable compressed gas cylinder, a pneumatically pumped gas reservoir, a spring-activated compressed gas system and an external compressed gas line.

3. The bug killing gun, as described in claim 1, wherein said projectile loading mechanism further comprises:
a mid-chamber pipe, said pipe extending downwardly from said lower end of said cylindrical chamber;
a trajectory guide, said guide disposed below said cylindrical chamber, having a hollow bore sized to fit slidably about said pipe and having a vertical slot extending downwardly from said lower end for a first predetermined distance and terminating in a stopping surface;
said trajectory guide being disposed about said pipe and providing a support platform for attachment of said projectile storage magazine;
said metering rod being cylindrical in shape and being sized to fit slidably within said pipe and having said orthogonal activation bar extending from said lower end thereof and said through hole disposed above said activation bar, said through hole being orthogonal to said activation bar and said metering rod and sized and disposed to align with said chamber when said bar is positioned against said stopping surface;
said subordination pole being pivotally mounted to a cover of said compressed gas source, said anterior end comprising a metering slot, said metering slot surrounding said activation bar, said posterior end being urged downwardly by said cylindrical pin and cam plate to move said metering rod upwardly into the projectile storage magazine during operation of said cocking mechanism, said particulate projectiles filling said through hole of said metering rod as it moves in said projectile storage magazine surrounded by said particulate projectiles; and
said posterior end of said subordination pole being urged upwardly by said cylindrical pin and said cam plate during activation of said compressed gas release mechanism, said metering slot moving said activation bar downwardly, aligning said through hole with said chamber permitting said compressed gas source to drive said particulate projectiles out of said chamber and through said barrel.

4. The bug killing gun, as described in claim 1, wherein said support stock further comprises a sight glass, said sight glass positioned adjacent said magazine and permitting a view of a level of said particulate projectiles contained therein.

5. The bug killing gun, as described in claim 1, further comprising an automatic cocking status indicator, said cocking status indicator moves to a raised, visible position after cocking of said gun and moves to a lowered, hidden position after discharge of the gun.

6. The improved bug killing gun, as described in claim 1, wherein a pistol grip and a forearm of said stock have flattened lower surfaces, said flattened surfaces permitting said bug killing gun to be balanced in an upright position for adding said particulate projectiles to said projectile storage magazine.

7. The bug killing gun, as described in claim 2, wherein said spring-activated compressed gas system further comprises:
a cylinder, said cylinder having a front end and a rear end and being fluidly connected to said chamber at said front end;
a piston, said piston fitting sealably in said cylinder and being disposed therein;
a first compression spring, said first compression spring urging said piston toward said front end;
a spring compression mechanism, said compression mechanism urging said piston towards said rear end and compressing said first compression spring;
a latching mechanism, said latching mechanism releasably retaining said piston adjacent said rear end and retaining said first compression spring in a compressed state; and
wherein a user operates said cocking mechanism, said spring compression mechanism is operated, said piston is urged toward said rear end of said cylinder, said spring is compressed and said spring and said piston are retained by said latching mechanism until released, allowing said piston to move rapidly toward said front end of said cylinder, providing a burst of compressed gas in said cylinder and to said connected chamber.

8. The bug killing gun, as described in claim 7, wherein said compressed gas release mechanism further comprises:
a trigger, said trigger being rotatably mounted to said stock and urged in a counter-clockwise direction by a trigger return spring, said trigger return spring being constrained by a first channel in said stock;
said trigger having an upper protrusion, said upper protrusion engaging an internal safety pivot, said safety pivot preventing release of said latching mechanism unless operation of said cocking mechanism is completed;
said trigger having an elevating ramp disposed rearwardly of said upper protrusion, said elevating ramp urging a releasing bracket of said latching mechanism upwardly against a downwardly urging second compression spring as said trigger is pivoted in a clockwise direction;
said releasing bracket being pivotally mounted to said stock and having an upward pointing travel limiting arm disposed within a notch in said stock, and having a downwardly facing rib, said rib releasably engaging an upwardly facing control notch in said main pole;
said main pole being attached to said piston, having an upwardly angled ramp at a rear end, disposed behind said control notch, said ramp guiding said rib into said control notch, said main pole moving rearwardly in a second channel in said stock during operation of said cocking mechanism; and
said releasing bracket retaining said main pole in a first, cocked position as said rib engages said control notch and releasing said main pole to a second, fired position as said trigger is pivoted in a clockwise direction elevating said releasing bracket and raising said rib from said control notch, allowing said main pole and said piston to move forward as urged by said compression spring, pressurizing said cylinder.

9. The improved bug killing gun, as described in claim 7, wherein said spring compression mechanism further comprises:
a primary gear rack, said gear rack being slidably disposed in a gear rack channel in said stock, having gear teeth disposed upon an upper surface and having mounting fixtures adjacent a forward end for attachment of a slide handle;

a drive gear, said drive gear rotatably mounted to a cocking sled, said cocking sled moving slidably within said primary gear rack;

a secondary gear rack, said secondary rack attached below said piston and being disposed above said drive gear;

said primary gear rack engaging said drive gear and said drive gear engaging said secondary gear rack; and wherein rearward movement of said slide handle moves said primary gear rack rearward, rotates said drive gear, and moves said cocking sled rearward, bearing against a cocking paddle on said main pole and moving said piston rearward, compressing said first compression spring.

10. The improved bug killing gun, as described in claim 9, further comprising:

a spring-loaded cocking mechanism lock-out block, said lockout block being pivotally mounted to an underside of said cover of said compressed gas source and having a pivoting ramp disposed on a first side edge, a retaining notch disposed forward of said pivoting ramp, a stepped angled cam orthogonally disposed above said pivoting ramp;

said pivoting ramp slidably engaging a rear surface of a vertical locking tab, said locking tab being affixed to a side rail of said cocking mechanism, said retaining notch moving to block rearward movement of said locking tab as said notch moves past said tab during forward movement of said cocking mechanism, thereby preventing a second activation of said cocking mechanism;

a cam activating rod, said activating rod affixed to said subordination pole, adjacent said anterior end and rearward of said metering slot; and said cam activating rod bearing on said stepped angled cam during activation of said compressed gas release mechanism and causing said lock-out block to pivot inwardly, causing said retaining notch to disengage from said rear surface of said locking tab, thereby permitting activation of said cocking mechanism.

11. The bug killing gun, as described in claim 9, wherein:

a control pin is attached to a first end of an internal safety pivot, said control pin moves in a slot in said cocking sled, maintains said first end of said internal safety pivot in an elevated position during rearward movement of said cocking sled, causing a second end of said pivot to engage an upper protrusion at an upper end of said trigger of said compressed gas release mechanism, thereby preventing activation of said compressed gas release mechanism; and said control pin causing downward movement of said first end of said internal safety pivot to a lowered position upon completion of forward movement of said cocking sled, said downward movement permitting release of said upper protrusion of said trigger and permitting activation of said gas release mechanism.

12. The improved bug killing gun, as described in claim 8, further comprising a laser sighting device, said laser sighting device comprising:

a battery powered laser, said laser capable of producing a laser aiming spot;

a housing, said housing adapted to contain said laser, a battery power source and a control circuit for said laser; and an attachment mechanism, said attachment mechanism adapted to attach said laser sighting device adjacent a distal end of said barrel.

13. The improved bug killing gun, as described in claim 12, further comprising elevation and windage adjustments for an aiming point of said laser aiming spot.

14. The improved bug killing gun, as described in claim 12, further comprising a power switch, said switch controlling power to said laser.

15. The improved bug killing gun, as described in claim 14, wherein said power switch is integral with said trigger, wherein initial rearward movement of said trigger completes a circuit within said power switch, thereby providing said laser aiming spot prior to activation of said compressed gas release mechanism.

\* \* \* \* \*